US012549025B2

(12) United States Patent
Sprague et al.

(10) Patent No.: US 12,549,025 B2
(45) Date of Patent: Feb. 10, 2026

(54) BATTERY CONFIGURATION FOR GAS ENGINE REPLACEMENT DEVICE

(71) Applicant: MILWAUKEE ELECTRIC TOOL CORPORATION, Brookfield, WI (US)

(72) Inventors: Connor P. Sprague, Milwaukee, WI (US); Evan M. Glanzer, Milwaukee, WI (US); John E. Koller, Brookfield, WI (US); Patrick D. Gallagher, Oak Creek, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 328 days.

(21) Appl. No.: 17/114,777

(22) Filed: Dec. 8, 2020

(65) Prior Publication Data

US 2021/0175479 A1    Jun. 10, 2021

Related U.S. Application Data

(60) Provisional application No. 62/945,697, filed on Dec. 9, 2019.

(51) Int. Cl.
*H01M 2/10* (2006.01)
*H01M 10/42* (2006.01)
(Continued)

(52) U.S. Cl.
CPC ......... *H02J 7/0063* (2013.01); *H01M 10/425* (2013.01); *H01M 10/441* (2013.01);
(Continued)

(58) Field of Classification Search
CPC ...... H02J 7/0013; H02J 7/0024; H02J 7/0042; H02J 7/0048; H01M 10/425; H01M 10/441; H01M 2220/00
See application file for complete search history.

(56) References Cited

U.S. PATENT DOCUMENTS 5,134,901 A * 8/1992 Grady ................... B01F 23/235
                                                261/DIG. 26
5,787,693 A    8/1998 Dyke et al.
(Continued)

FOREIGN PATENT DOCUMENTS

JP    H10285811 A    10/1998
JP    2010130716 A    6/2010
(Continued)

OTHER PUBLICATIONS

Japanese Patent Office Action for Application No. 2024-000262 dated Nov. 26, 2024 (17 pages including English translation).
(Continued)

*Primary Examiner* — Julian D Huffman
*Assistant Examiner* — Sadia Kousar
(74) *Attorney, Agent, or Firm* — Michael Best & Friedrich LLP

(57) ABSTRACT

Battery configuration for gas engine replacement device. One embodiment provides a gas engine replacement device (10) including a housing (14) and a first battery pack (50) and a second battery pack (50) connected to the housing (14). The gas engine replacement device (10) also includes a motor (36) within the housing (14) and a power switching network (310) coupled to the motor (36), the first battery pack (50), and the second battery pack (50) and configured to drive the motor (36). The gas engine replacement device (10) further includes an electronic processor (302) coupled to the power switching network (310) and configured to sequentially discharge the first battery pack (50) and the second battery pack (50) to the power switching network (310) to drive the motor (36).

20 Claims, 15 Drawing Sheets

(51) Int. Cl.
*H01M 10/44* (2006.01)
*H02J 7/00* (2006.01)
(52) U.S. Cl.
CPC .......... *H02J 7/0024* (2013.01); *H02J 7/0048* (2020.01); *H01M 2220/30* (2013.01)

(56) References Cited

U.S. PATENT DOCUMENTS

| | | | |
|---|---|---|---|
| 6,104,162 | A | 8/2000 | Sainsbury et al. |
| 6,605,923 | B1 | 8/2003 | Kellogg |
| 10,666,064 | B2* | 5/2020 | Hennesy ............. H02J 7/00712 |
| 2002/0067080 | A1 | 6/2002 | Neumann |
| 2011/0248684 | A1* | 10/2011 | Zhou ....................... B60L 53/00 320/137 |
| 2014/0091623 | A1 | 4/2014 | Shippy et al. |
| 2014/0091751 | A1* | 4/2014 | Workman ............. H02J 7/0016 320/126 |
| 2014/0366501 | A1* | 12/2014 | Goto ....................... B60L 50/64 56/14.7 |
| 2015/0015205 | A1* | 1/2015 | Ito ........................... H02J 50/10 320/113 |
| 2015/0333301 | A1 | 11/2015 | Ota et al. |
| 2016/0020443 | A1* | 1/2016 | White ....................... B25F 5/00 318/245 |
| 2018/0138839 | A1* | 5/2018 | Puzio ..................... H02K 11/28 |
| 2018/0169851 | A1 | 6/2018 | Radovich et al. |
| 2019/0006980 | A1 | 1/2019 | Sheeks et al. |
| 2019/0160972 | A1* | 5/2019 | Zeiler ................. H01M 10/425 |
| 2019/0238083 | A1* | 8/2019 | White .................... H01M 50/20 |
| 2019/0356147 | A1 | 11/2019 | Mueckl et al. |
| 2020/0076337 | A1 | 3/2020 | Abbott et al. |
| 2021/0129190 | A1* | 5/2021 | Qiao ..................... B05B 9/0413 |

FOREIGN PATENT DOCUMENTS

| | | |
|---|---|---|
| JP | 2011526217 A | 10/2011 |
| JP | 2011218510 A | 11/2011 |
| JP | 2014233785 A | 12/2014 |
| JP | 2016101107 A | 6/2016 |

OTHER PUBLICATIONS

Japanese Patent Office Action for Application No. 2022-534668 dated Jun. 20, 2023 (7 pages including statement of relevance).
Extended European Search Report for Application No. 20897898.1 dated Oct. 24, 2023 (10 pages).
Chinese Patent Office Action for Application No. 202080091702.9 dated Feb. 28, 2025 (78 pages including English translation).
International Search Report and Written Opinion for Application No. PCT/US2020/063706 dated Apr. 15, 2021 (15 pages).
Chinese Patent Office Action for Application No. 202080091702.9 dated Jul. 31, 2025 (42 pages including English translation).

* cited by examiner

BATTERY CONFIGURATION FOR GAS ENGINE REPLACEMENT DEVICE

RELATED APPLICATIONS

This application claims the benefit of U.S. Provisional Patent Application No. 62/945,697, filed on Dec. 9, 2019, the entire content of which is hereby incorporated by reference.

FIELD

The present application relates to battery configurations for gas engine replacement devices.

BACKGROUND

Outdoor power equipment (e.g., lawn and garden equipment) and construction equipment (e.g., concrete mixers, plate compactors), commonly referred to as power equipment, may include a gas engine to run the equipment. However, gas engines produce emissions and are not generally adaptable for optimal performance of the power equipment.

SUMMARY

Gas engines produce emissions and are not readily configurable for particular applications of various types of equipment. Gas engine replacement devices, also referred to as powerheads, that use, for example, Lithium-ion battery packs and electric brushless motors provide several advantages over gas engines. However, the power density of gasoline is higher than current Lithium-ion battery chemistry or other widely available battery technology. As a result, battery powered gas engine replacement devices generally include limited runtime when compared to similar sized gasoline powered engines. In other words, an attached battery pack powering a gas engine replacement is prone to be fully discharged more quickly than a gas engine is to deplete its gasoline fuel supply, where the gas engine replacement with battery pack has a similar size to that of the gas engine with fuel supply.

Accordingly, there is a need to increase runtime of the battery powered gas engine replacement devices to, for example, provide similar runtime as gas engines.

One embodiment provides a gas engine replacement device including a housing and a power source having a first battery receptacle and a second battery receptacle provided on the housing. The gas engine replacement device also includes a first battery pack received in the first battery receptacle and a second battery pack received in the second battery receptacle. The gas engine replacement device includes a motor within the housing and a power switching network coupled between the motor and the first battery pack and the second battery pack. The first battery pack is coupled to the power switching network through a first switch and the second battery pack is coupled to the power switching network through a second switch. The gas engine replacement device also includes an electronic processor coupled to the first switch, the second switch, and the power switching network. The electronic processor is configured to connect the first battery pack to the power switching network and determine whether the state of charge of the first battery pack is below a predetermined threshold. The electronic processor is further configured to connect the second battery pack to the power switching network and disconnect the first battery pack from the power switching network when the state of charge of the first battery pack is below the predetermined threshold.

Another embodiment provides a method for increasing the runtime of a gas engine replacement device. The gas engine replacement device includes a first battery pack coupled to a power switching network through a first switch and a second battery pack coupled to the power switching network through a second switch. The method includes connecting the first battery pack to the power switching network and determining whether the state of charge of the first battery pack is below a predetermined threshold. The method also includes connecting the second battery pack to the power switching network and disconnecting the first battery pack from the power switching network when the state of charge of the first battery pack is below the predetermined threshold.

Another embodiment provides a gas engine replacement device including a housing and a power source having a battery receptacle and a module port provided on the housing. The gas engine replacement device also includes a first battery pack received in the battery receptacle and a battery module coupled to the module port. A second battery pack is received in the battery module. The gas engine replacement device includes a motor within the housing and a power switching network coupled between the motor and the first battery pack and the module port. The first battery pack is coupled to the power switching network through a first switch and the battery module is coupled to the power switching network through a second switch. The gas engine replacement device also includes an electronic processor coupled to the first switch, the second switch, and the power switching network. The electronic processor is configured to connect the first battery pack to the power switching network and determine whether the state of charge of the first battery pack is below a predetermined threshold. The electronic processor is further configured to connect the battery module to the power switching network and disconnect the first battery pack from the power switching network when the state of charge of the first battery pack is below the predetermined threshold.

Another embodiment provides a method for increasing the runtime of a gas engine replacement device. The gas engine replacement device includes a first battery pack coupled to a power switching network through a first switch and a module port coupled to the power switching network through a second switch. The module port is configured to be coupled to battery module receiving a second battery pack. The method includes connecting the first battery pack to the power switching network and determining whether the state of charge of the first battery pack is below a predetermined threshold. The method also includes connecting the battery module to the power switching network and disconnecting the first battery pack from the power switching network when the state of charge of the first battery pack is below the predetermined threshold.

Another embodiment provides a gas engine replacement device including a housing, a battery receptacle provided on the housing, a battery pack received in the battery receptacle, and an on-board charging circuit for charging the battery pack. The gas engine replacement device includes a motor within the housing and a power switching network coupled between the motor and the first battery pack and the second battery pack. The battery pack is coupled to the power switching network through a discharge switch and the battery pack is coupled to the on-board charging circuit through a charge switch. The gas engine replacement device also includes a power cord to provide charging power to the on-board charging circuit, and an electronic processor coupled to the discharge switch, the charge switch, and the power switching network. The electronic processor is configured to connect the battery pack to the power switching network to operate the motor and to connect the battery pack to the on-board charging circuit to charge the battery pack.

Other features and aspects will become apparent by consideration of the following detailed description and accompanying drawings.

DETAILED DESCRIPTION

Figure 1:
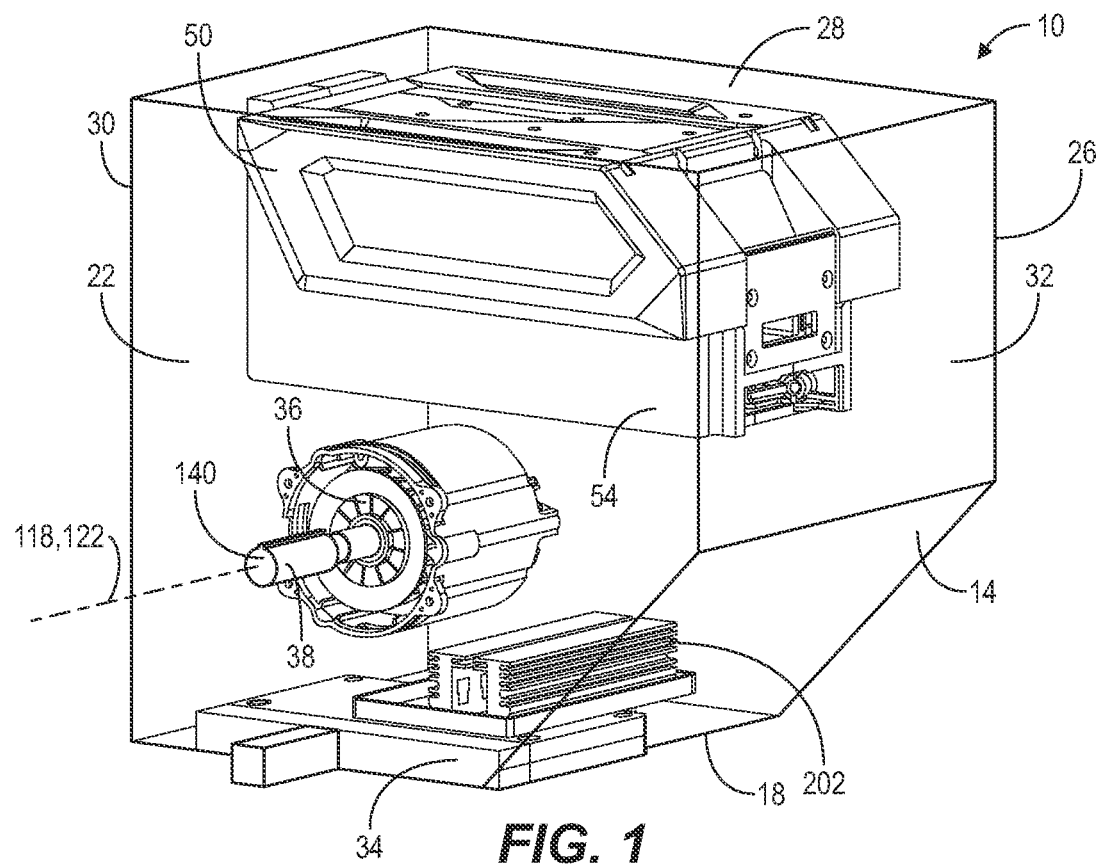
FIG. 1 is a perspective view of a gas engine replacement device in accordance with an embodiment.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments.

Figure 2:
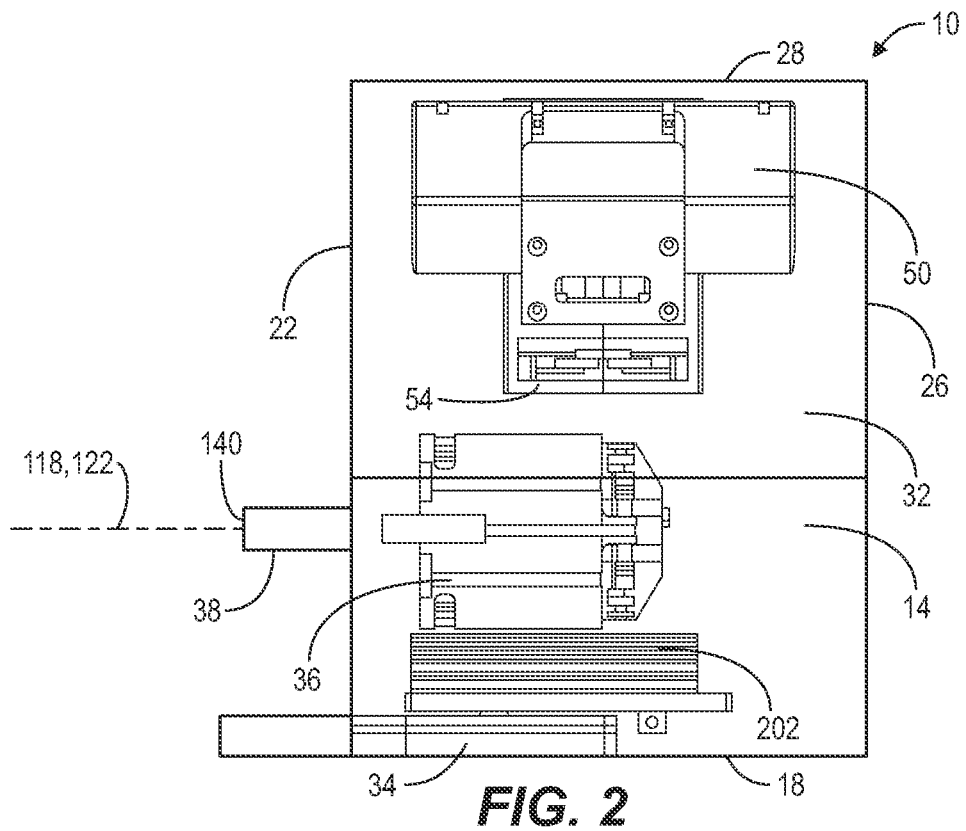
FIG. 2 is a plan view of the gas engine replacement device of FIG. 1.
Figure 3:
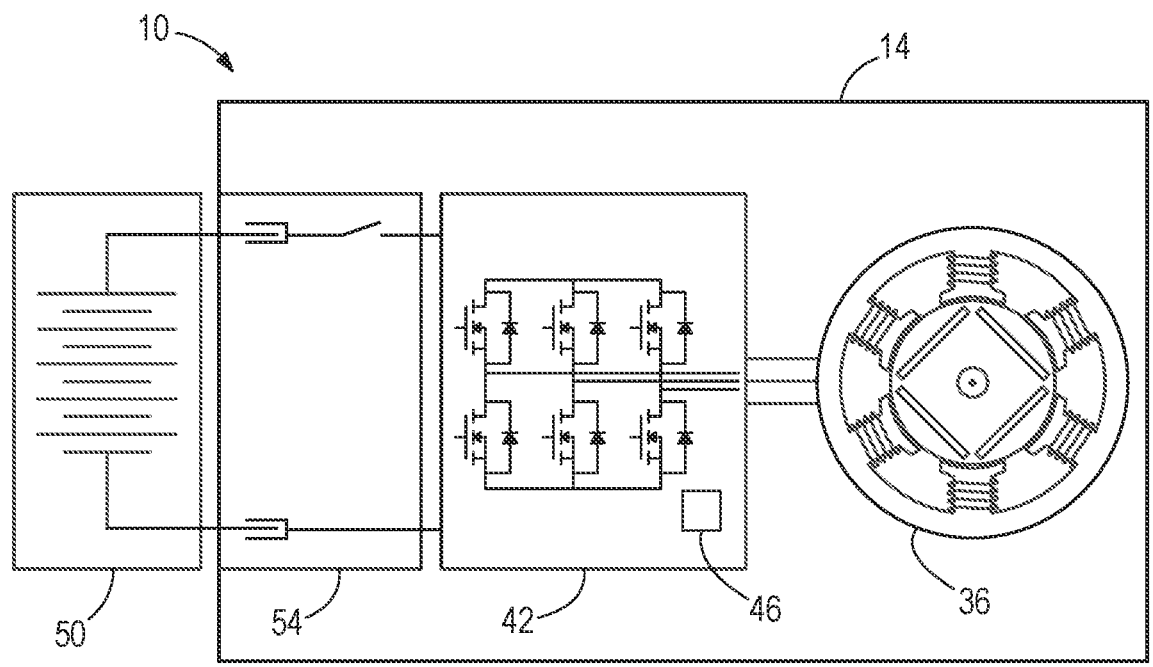
FIG. 3 is a schematic view of the gas engine replacement device of FIG. 1.

As shown in FIGS. 1 and 2, a gas engine replacement device 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. patent application Ser. No. 16/551,197, filed Aug. 26, 2019, the entire content of which is incorporated herein by reference.

Figure 5A:
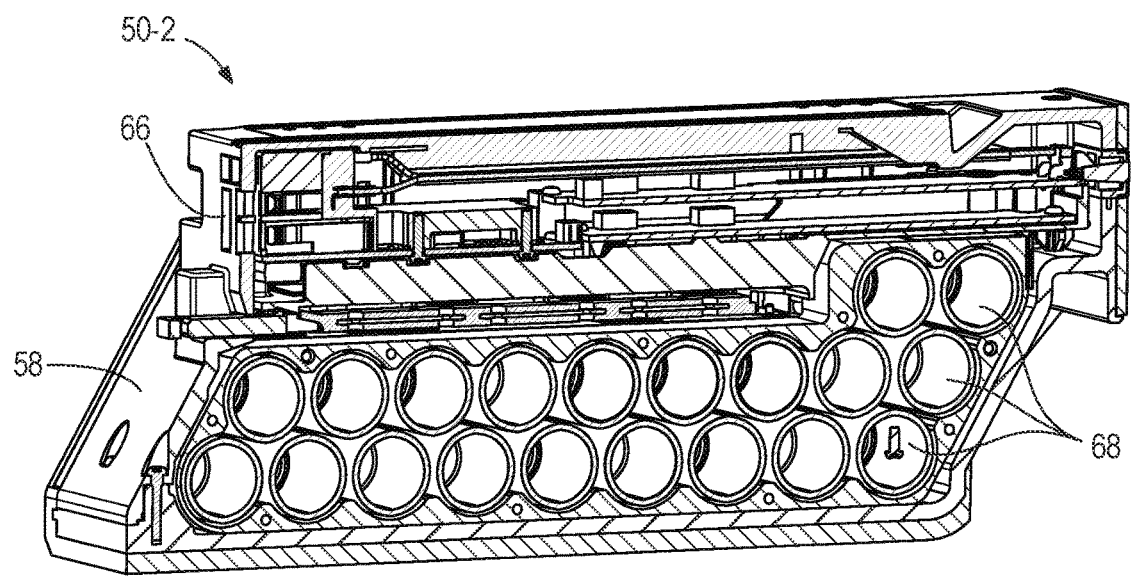
FIGS. 5A and 5B are cross-sectional views of the battery packs of FIGS. 4A and 4B.
Figure 6:
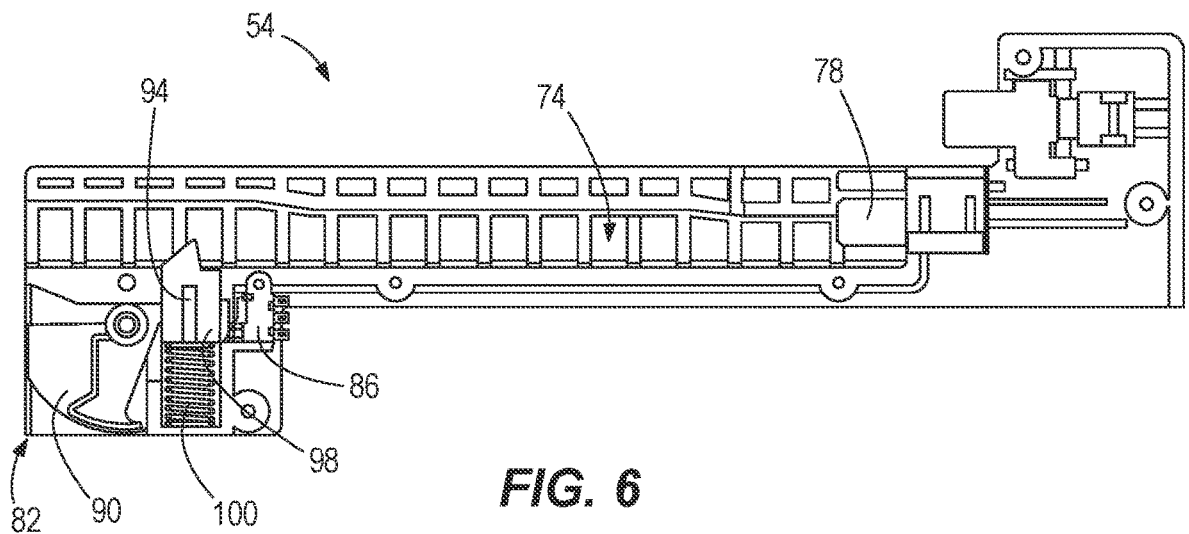
FIG. 6 is a cross-sectional view of a battery receptacle of the gas engine replacement device of FIG. 1.

As shown in FIGS. 1-6, the gas engine replacement device 10 also includes a battery pack 50-1, 50-2 that is removably received in a battery receptacle 54 in the housing 14 to transfer current from the battery pack 50-1, 50-2 to the motor 36 via the control electronics 42. The battery pack 50-1, 50-2 may be singularly referred to as the battery pack 50. With reference to FIGS. 4-6, the battery pack 50 includes a battery pack housing 58 with a support portion 62 and a first terminal 66 that is electrically connected to a plurality of battery cells 68 supported by the battery pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. Patent Publication No. 2019/0006980 filed Jul. 2, 2018, the entire content of which is incorporated herein by reference.

Figure 4A:
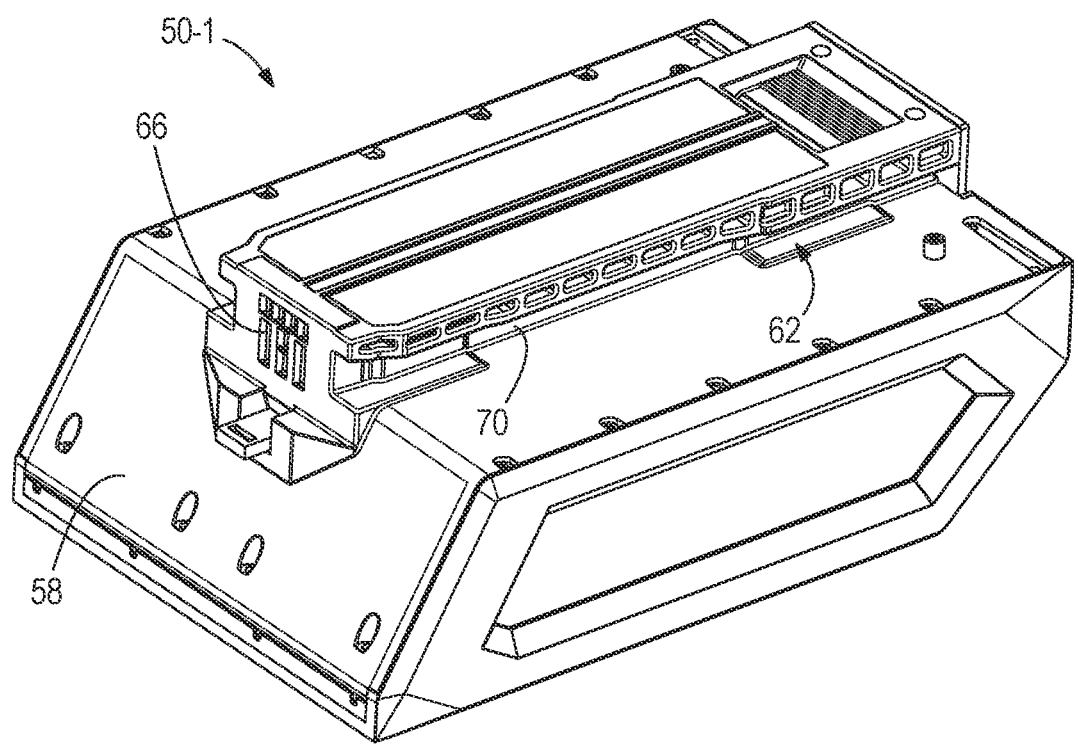
FIGS. 4A and 4B are perspective views of a battery pack of the gas engine replacement device of FIG. 1.
Figure 4B:
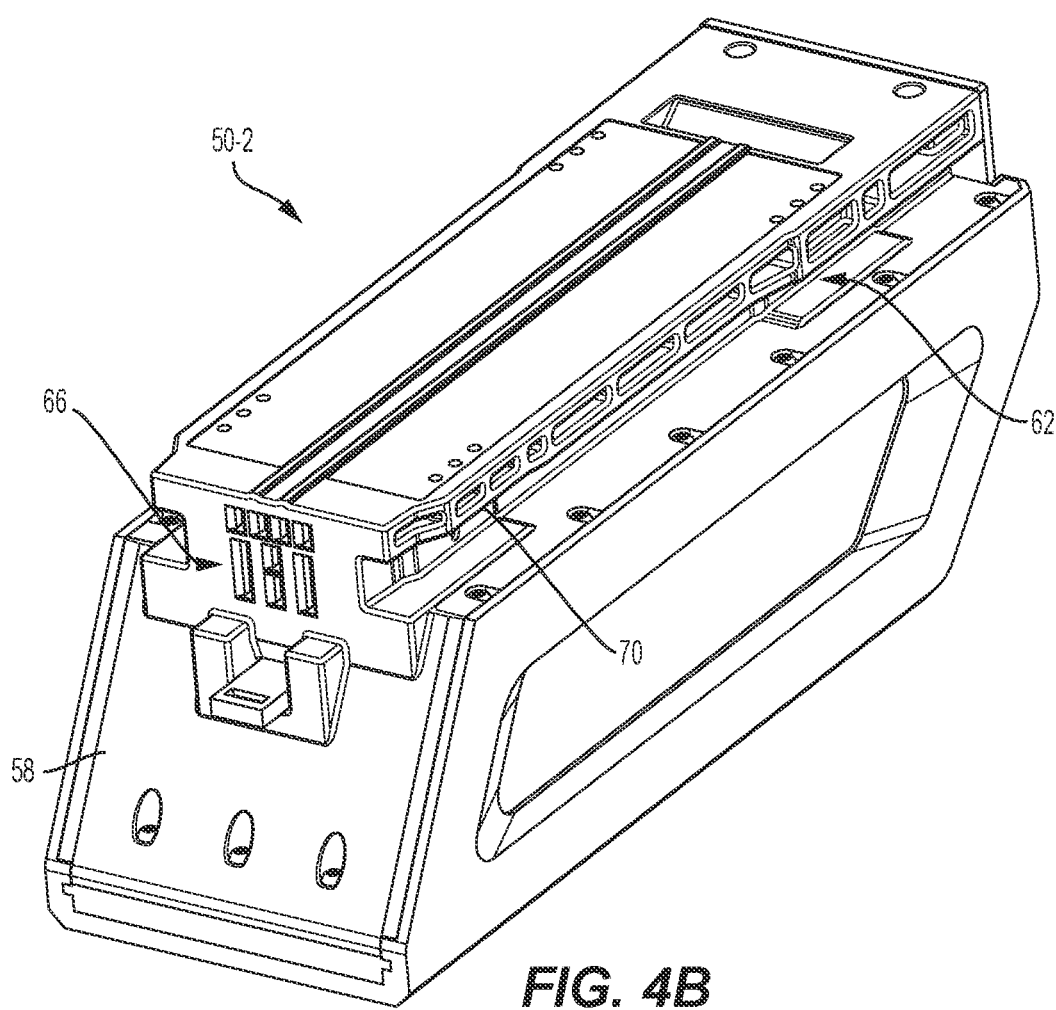
Figure 5B:
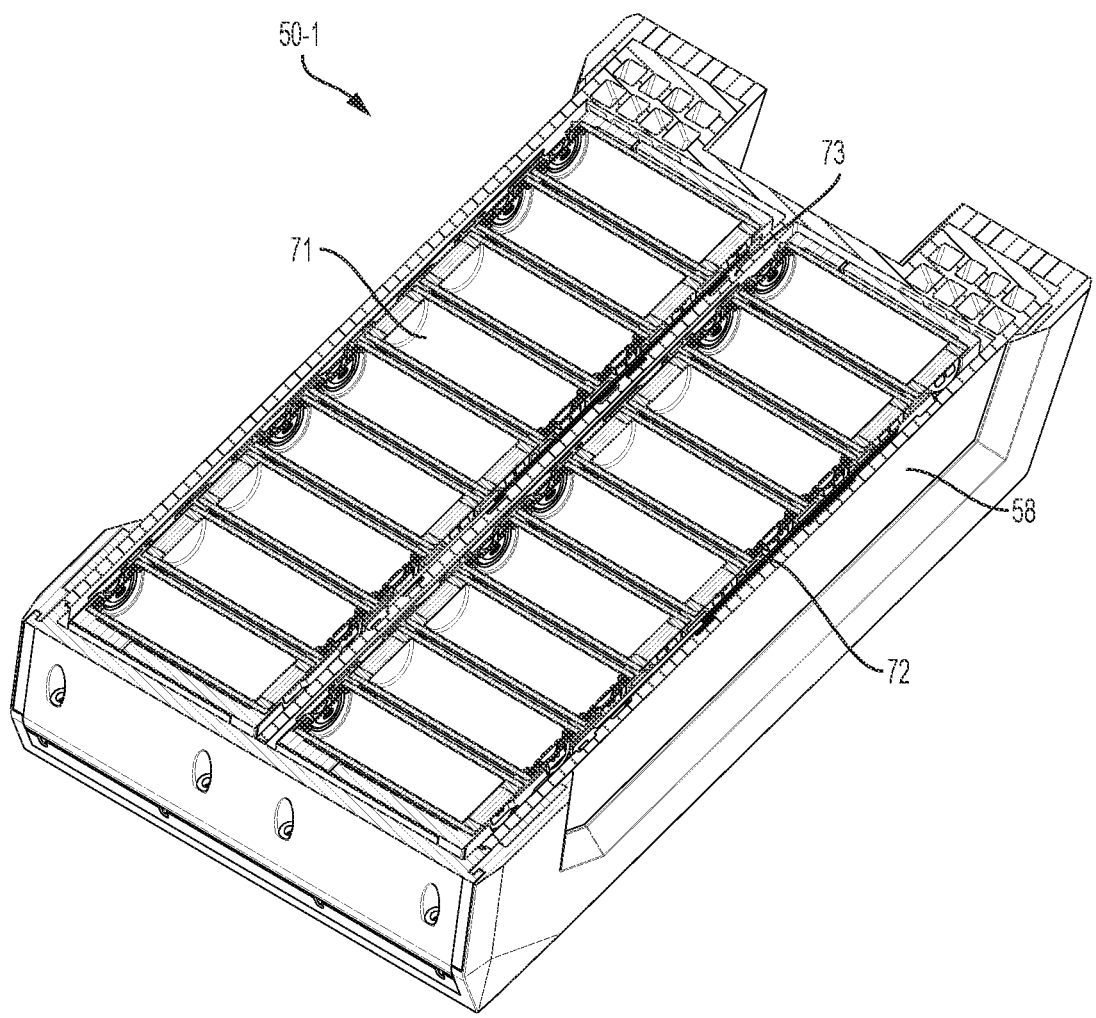

FIGS. 4A and 4B illustrate embodiments of the battery pack 50. The battery pack 50 may include one or more cell strings each having a number (e.g., 10) of battery cells 68 connected in series to provide a desired discharge output (e.g., nominal voltage (e.g., 20V, 40V, 60V, 80V, 120V) and current capacity). FIG. 4A illustrates a battery pack 50-1 having a 20S2P configuration. The battery pack 50-1 includes two cell strings of twenty series connected cells, the cell strings being connected in parallel. FIG. 5B is a cross-section of the battery pack 50-1 of FIG. 4A and illustrates a first cell string 71 and a second cell string 72 separated by a partition 73 of the battery pack housing 58. FIG. 4B illustrates a battery pack 50-2 having a 20S1P configuration. The battery pack 50-2 includes one cell string of twenty series connected cells. In other embodiments, other combinations of battery cells are also possible. FIG. 5A is a cross-section of the battery pack 50-2 of FIG. 4B and illustrates a cross section of the cell string in the battery pack housing 58.

In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the gas engine replacement device 10 in accordance with some embodiments. The battery receptacle 54 includes the projection/recess portion 74, a second terminal 78, a latching mechanism 82, and a power disconnect switch 86. The projection/recess portion 74 cooperates with the projection/recess portion 70 of the battery pack 50 to attach the battery pack 50 to the battery receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the gas engine replacement device 10. In some embodiments, the battery receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 99 of the battery receptacle 54 and is biased toward a latching position by a biasing member 100 (e.g., a spring) to protrude through a surface of the battery receptacle 54 and into a cavity in the battery pack 50.

The latching mechanism 82 also includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10. When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
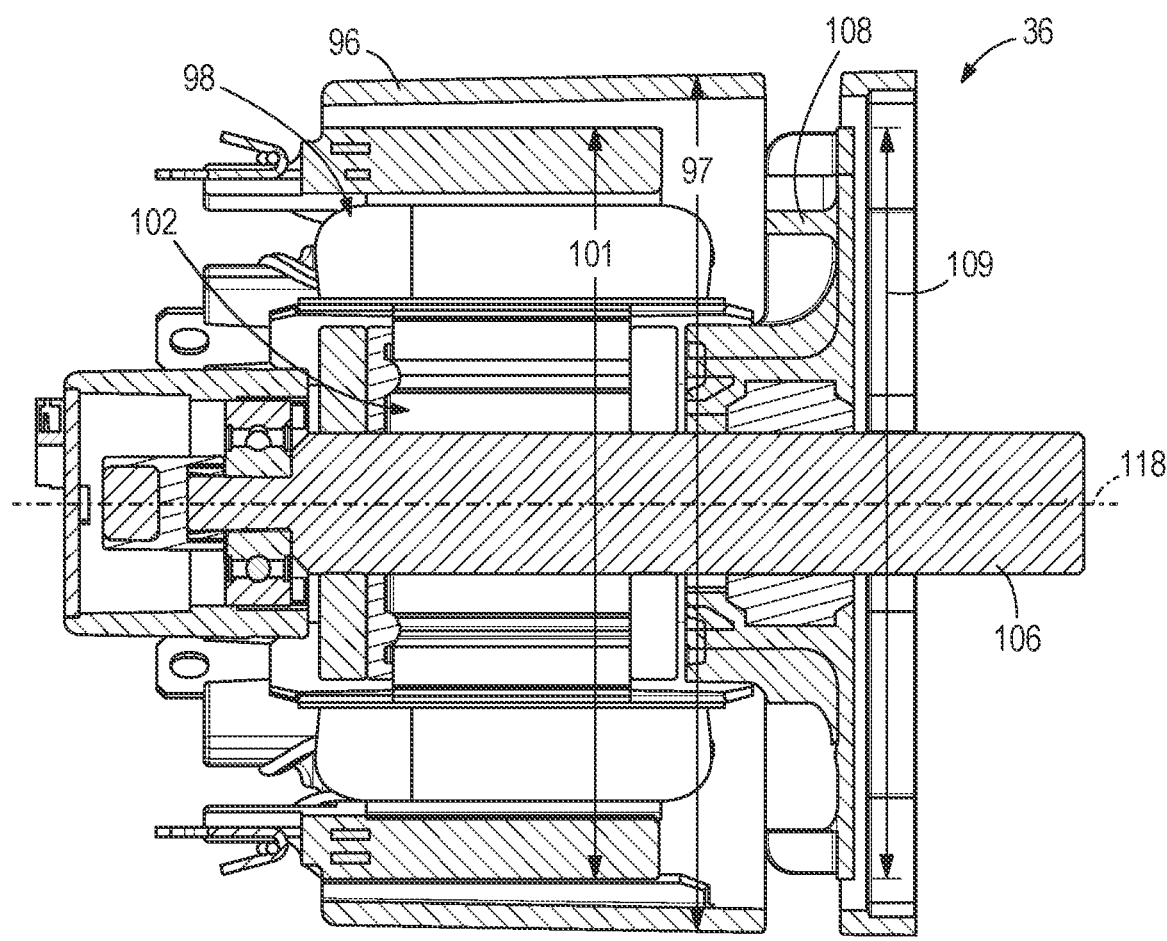
FIG. 7 is a cross-sectional view of a motor of the gas engine replacement device of FIG. 1.

As shown in FIG. 7, the motor 36 includes a motor housing 96 having an outer diameter 97, a stator 98 having a nominal outer diameter 101 of up to about 80 mm, a rotor 102 having an output shaft 106 and supported for rotation within the stator 98, and a fan 108. A similar motor is described and illustrated in U.S. Patent Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch (not shown) for quick overload control. In some embodiments, the motor 36 has a volume of up to about 443,619 $mm^3$. In some embodiments, the motor 36 has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor 102) of up to about 80 mm.

Figure 8:
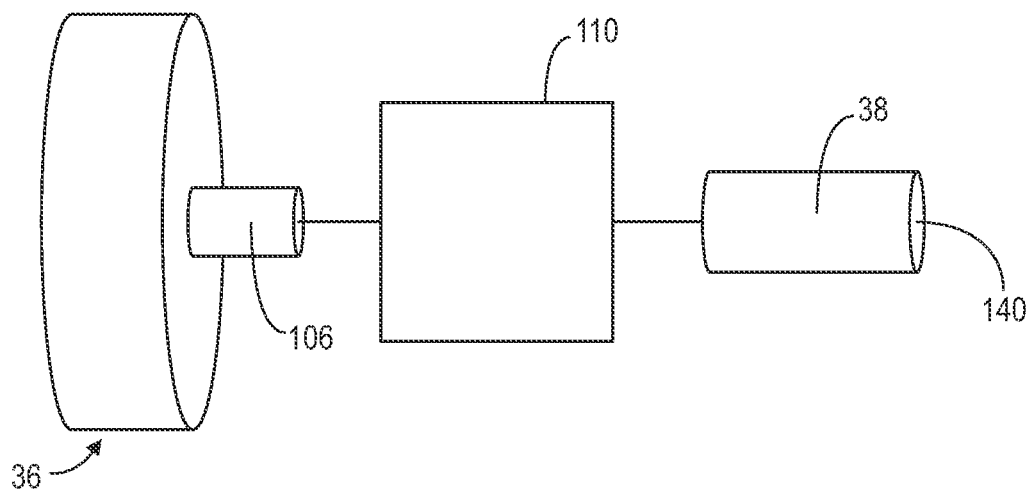
FIG. 8 is a schematic view of a motor, a gear train, and a power take-off shaft of the gas engine replacement device of FIG. 1.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor 102, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators (not shown). In some embodiments, the gas engine replacement device 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 102 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft 38 and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius.

Figure 9:
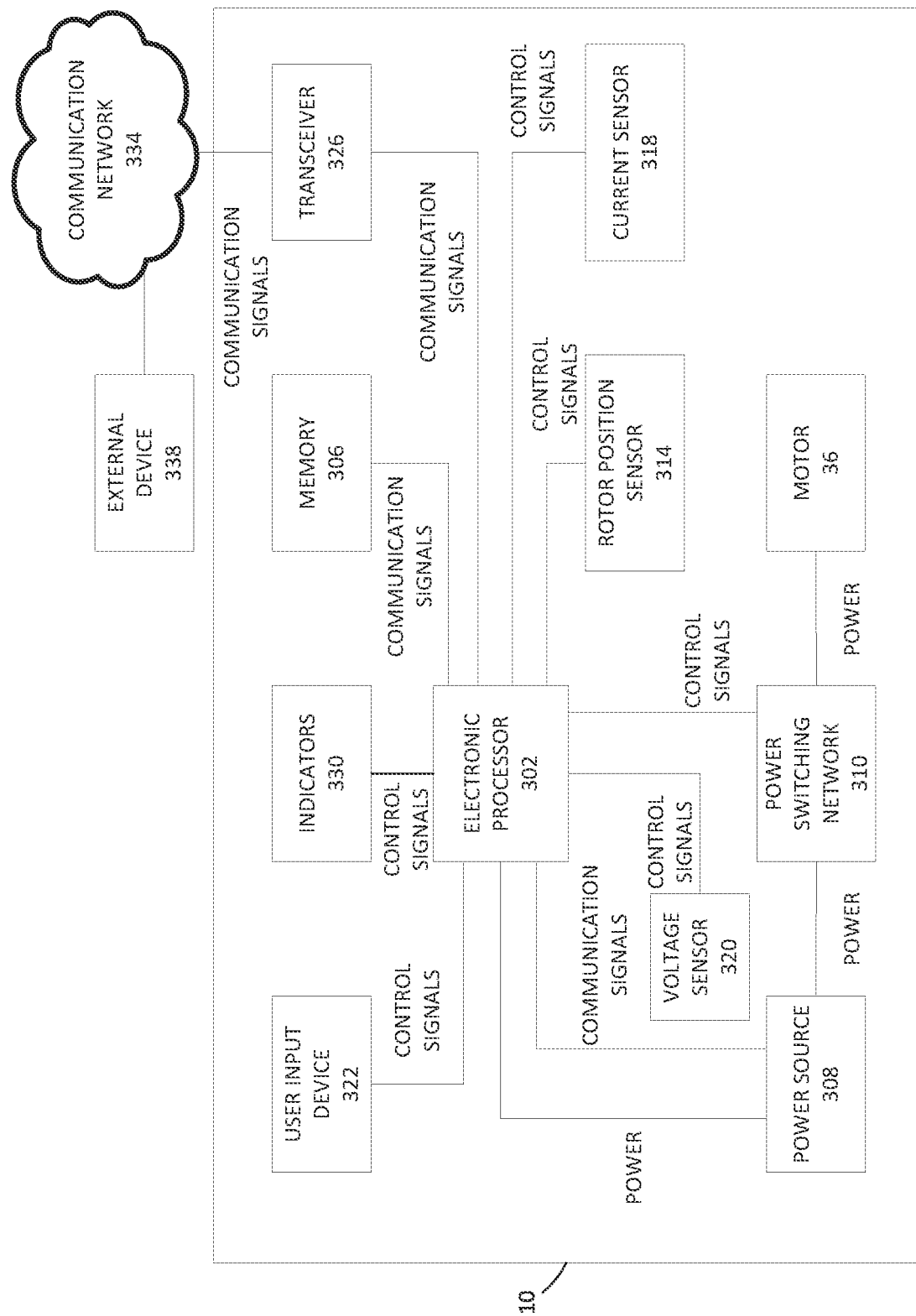
FIG. 9 is a block diagram of the gas engine replacement device of FIG. 1.

FIG. 9 illustrates a simplified block diagram of the gas engine replacement device 10 according to one example embodiment. As shown in FIG. 9, the gas engine replacement device 10 includes an electronic processor 302, a memory 306, a power source 308, a power switching network 310, the motor 36, a rotor position sensor 314, a current sensor 318, a voltage sensor 320, a user input device 322 (e.g., a trigger or power button), a transceiver 326, and indicators 330 (e.g., light-emitting diodes). In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, current sensor 318, voltage sensor 320, user input device 322 (e.g., a trigger or power button), transceiver 326, and indicators 330 (e.g., light-emitting diodes) form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein. The memory 306 also stores firmware including configurable device settings of the gas engine replacement device 10. The electronic processor 302 accesses the firmware stored in the memory 306 to control the motor 36 according to the device settings in the firmware.

As described above, in some embodiments, the power source 308 may include one or more battery packs 50 received in battery receptacles 54 on the housing 14. The power source 308 may also include one or more battery modules 158 coupled to the gas engine replacement device 10.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount to which the user input device 322 is depressed is related to or corresponds to a desired speed of rotation of the motor 36. In other embodiments, the amount to which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge that receives pulse-width modulated (PWM) signals from the electronic processor 302 to drive the motor 36.

The rotor position sensor 314, the current sensor 318, and the voltage sensor 320 are coupled to the electronic processor 302 and communicate to the electronic processor 302 various control signals indicative of different parameters of the gas engine replacement device 10, the motor 36, the power source 308, or a combination thereof. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back-emf) generated in the motor coils. The electronic processor 302 may determine the rotor position, the rotor speed, and the rotor acceleration based on the back-emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor 102 of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor 102.

The voltage sensor 320 is configured to measure the voltage of the power source 308, which corresponds to the state of charge of the power source 308, and provide a signal to the electronic processor 302 indicative of state of charge. In some embodiments, the voltage sensor 320 is incorporated into the power source 308 and the power source 308 (e.g., an electronic processor of the power source 308) communicates a signal indicative of the state of charge of the power source 308. In the case of the power source 308 include multiple battery packs, the voltage sensor is configured to measure voltage of each pack and provide a signal indicative of the corresponding state of charge of each pack.

The transceiver 326 allows for communication between the electronic processor 302 and an external device 338 (e.g., a smart phone, tablet, or laptop computer) over a wired or wireless communication network 334. In some embodiments, the transceiver 326 may comprise separate transmitting and receiving components. In some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302.

The communication network 334 provides a wired or wireless connection between the gas engine replacement device 10 and the external device 338. The communication network 334 may comprise a short range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, the status of the battery pack(s) 50, etc. The indicators 330 may also include elements to convey information to a user through audible or tactile outputs. In some embodiments, the indicators 330 include an eco-indicator that indicates an amount of power being used by the load during operation.

The connections shown between components of the gas engine replacement device 10 are simplified in FIG. 9. In practice, the wiring of the gas engine replacement device 10 is more complex, as the components of a gas engine replacement device 10 are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

Figure 10:
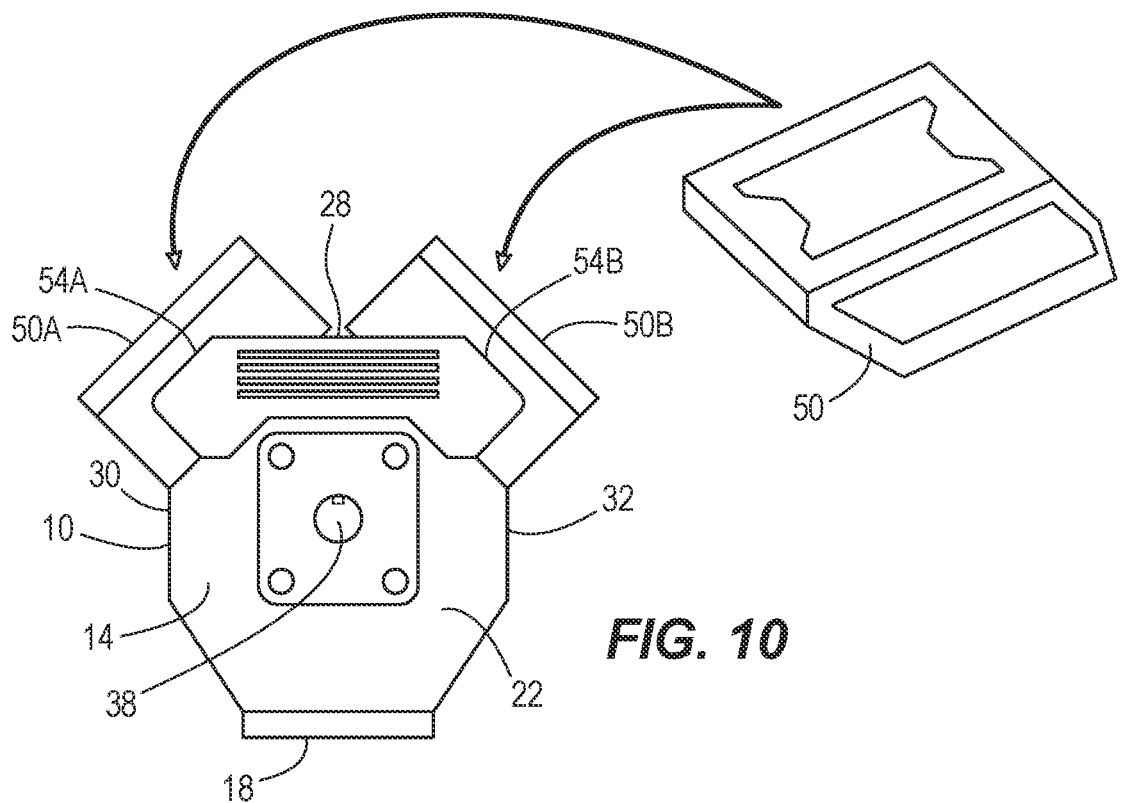
FIG. 10 is a perspective view of a gas engine replacement device in accordance with an embodiment.
Figure 11A:
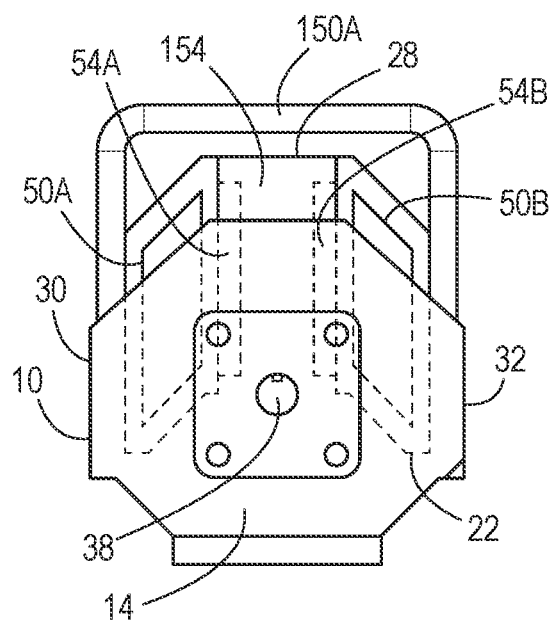
FIGS. 11A and 11B are perspective views of a gas engine replacement device in accordance with an embodiment.
Figure 11B:
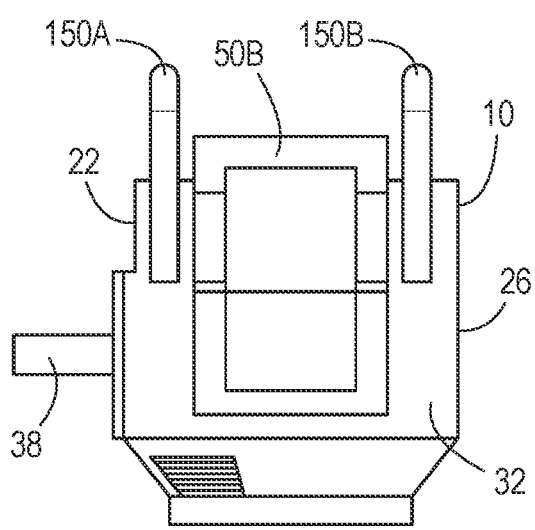

As discussed above, the gas engine replacement device 10 includes lower runtime than similar sized gas engines. FIG. 10-18 illustrate several battery configurations of the gas engine replacement device 10 that increase the runtime of the gas engine replacement device 10. As shown in FIGS. 10, 11A, and 11B, multiple battery receptacles 54 may be provided on the housing 14 of the gas engine replacement device 10 to receive multiple battery packs 50. In FIG. 10, the multiple battery receptacles 54 include and are individually labeled as a first battery receptacle 54A and a second battery receptacle 54B, and the multiple battery packs 50 include and are individually labeled as a first battery 50A and a second battery 50B.

As shown in FIG. 10, the battery receptacles 54 are provided on the housing 14 extending between the top (fourth side 28) and the side surfaces (fifth and sixth sides 30 and 32). A first battery receptacle 54A extends between the fourth side 28 and the fifth side 30, while a second battery receptacle 54B extends between the fourth side 28 and the sixth side 32. In some embodiments, the battery packs 50 may be received from the fourth side 28 such that the battery packs 50 slide from the top of the housing 14 downwards into the battery receptacles 54A and 54B. In some embodiments, the battery packs 50 may be received from the fifth side 30 and the sixth side 32 respectively such that the battery packs 50 slide from the side surfaces of the housing 14 upwards into the battery receptacles 54A and 54B. In other embodiments, the battery packs 50 may be received from the second side 22 and/or the third side 26 such that the battery packs 50 slide from the second side 22 to the third side 26 or vice versa into the battery receptacles 54A and 54B. The battery packs 50 protrude outside the housing 14 on the fourth side 28, the fifth side 30, and the sixth side 32.

As shown in FIGS. 11A and 11B, the housing 14 includes a first handle 150A and a second handle 150B that extend from the fifth side 30 to the sixth side 32. The first handle 150A is provided closer to the second side 22 and the second handle 150B is provided closer to the third side 26. The first battery receptacle 54A and the second battery receptacle 54B are provided between the first handle 150A and the second handle 150B on the fifth side 30 and the sixth side 32 respectively. The battery packs 50 are mounted from the fourth side 28 such that the battery packs 50 slide from the top of the housing 14 downwards into the battery receptacles 54A and 54B. The battery packs 50 are received within recesses provided on the fifth side 30 and the sixth side 32. Accordingly, the battery packs 50 do not extend beyond the housing 14 on the fifth side 30 and the sixth side 32. The battery packs 50 protrude beyond the top of the housing 14 on the fourth side 28. A support 154 may be provided on the top of the housing 14 extending approximately equal to the length of a portion of the battery pack 50 that protrudes beyond the top of the housing 14. The support 154 provides additional support for the battery packs 50 from the vibrations caused by the gas engine replacement device 10. The battery packs 50 and the support 154 do not extend beyond the first handle 150A and the second handle 150B. The first handle 150A and the second handle 150B provide additional protection to the battery packs 50 during a drop event.

Figure 12:
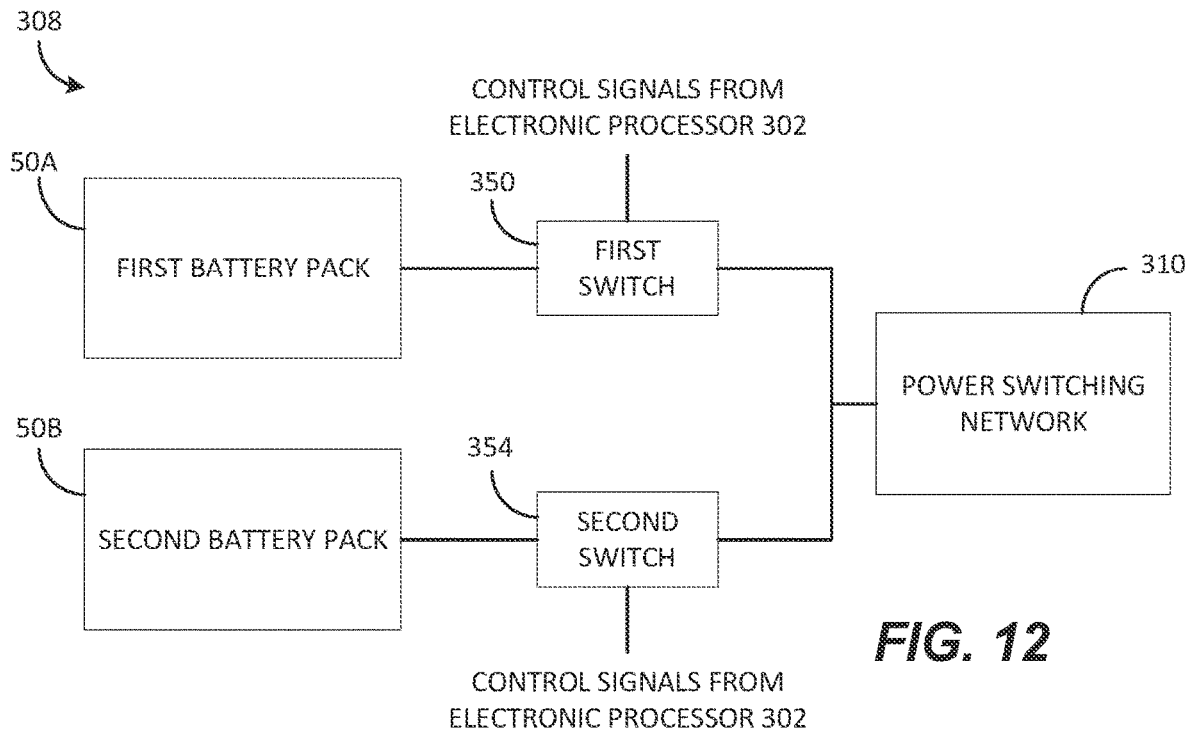
FIG. 12 is a block diagram of a power source of the gas engine replacement device of FIGS. 10-11B.

FIG. 12 is a simplified block diagram of the power source 308 according to one example embodiment. The power source 308 includes the first battery pack 50A and the second battery pack 50B and corresponds to the multiple battery pack gas engine replacement device 10 of FIGS. 10-11B. The power switching network 310 is coupled to the first battery pack 50A through a first switch 350 and to the second battery pack 50B through a second switch 354. The first switch 350 and the second switch 354 are, for example, FETs that are controlled by the electronic processor 302 to be enabled and disabled. When the first switch 350 is enabled, the first switch 350 allows current flow from the first battery pack 50A to the power switching network 310. When the first switch 350 is disabled, the first switch 350 blocks current flow from the first battery pack 50A to the power switching network 310. The second switch 354 is similarly controlled by the electronic processor 302 to allow and block current flow from the second battery pack 50B to the power switching network 310.

Figure 13:
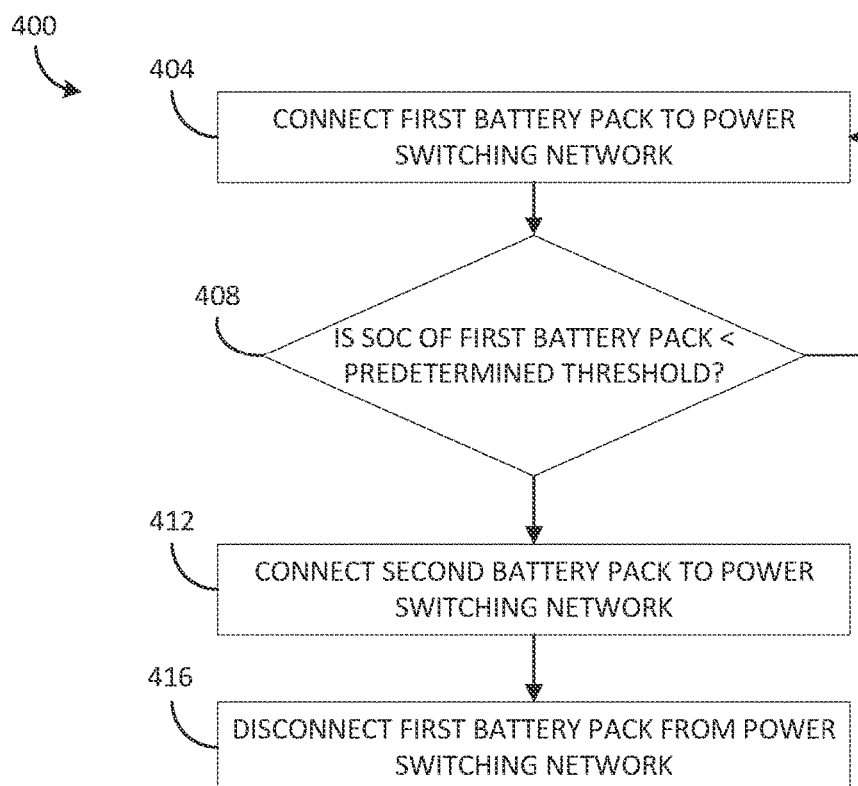
FIG. 13 is a flowchart of a method for increasing runtime of the gas engine replacement device of FIGS. 10-12.

During operation, the electronic processor 302 may, in some embodiments, connect only one of the first battery pack 50A and the second battery pack 50B to the power switching network 310 at a given time during operation (except for some temporary overlap when switching between packs). The electronic processor 302 discharges the first battery pack 50A and the second battery pack 50B sequentially to increase the runtime of the gas engine replacement device 10. FIG. 13 is a flowchart of an example method 400 for increasing a runtime of the gas engine replacement device 10. In the example illustrated, the method 400 includes connecting, using the first switch 350, the first battery pack 50A to the power switching network 310 (at block 404). The electronic processor 302 controls the first switch 350 to allow current flow from the first battery pack 50A to the power switching network 310. Prior to enabling the first switch 350, the electronic processor 302 may determine whether the first battery pack 50A is received in the first battery receptacle 54A and whether the state of charge of the first battery pack 50A is above a predetermined threshold.

The method 400 includes determining whether the state of charge of the first battery pack 50A is below the predetermined threshold (at block 408). In some embodiments, the gas engine replacement device 10 includes a voltage sensor (e.g., the voltage sensor 320) to measure a voltage of the first battery pack 50A and/or the second battery pack 50B. The electronic processor 302 determines the state of charge of the first battery pack 50A using the voltage sensor. In other embodiments, the first battery pack 50A includes an internal voltage sensor that determines a state of charge of the first battery pack 50A. The electronic processor 302 communicates with a battery electronic processor of the first battery pack 50A to receive the state of charge of the first battery pack 50A from the battery electronic processor. For example, the first battery pack 50A provides the state of charge information to the electronic processor 302 during a group read.

When the state of charge of the first battery pack 50A is above the predetermined threshold, the method 400 returns to block 404 and continues to operate the gas engine replacement device 10 using the first battery pack 50A. When the state of charge of the first battery pack 50A is below the predetermined threshold, the method 400 includes connecting, using the second switch 354, the second battery pack 50B to the power switching network 310 (at block 412). The electronic processor 302 controls the second switch 354 to allow current flow from the second battery pack 50B to the power switching network 310. Similarly as above, prior to enabling the second switch 354, the electronic processor 302 may determine whether the second battery pack 50B is received in the second battery receptacle 54B and whether the state of charge of the second battery pack 50B is above the predetermined threshold.

The method 400 also includes disconnecting, using the first switch 350, the first battery pack 50A from the power switching network 310 (at block 416). The electronic processor 302 controls the first switch 350 to block current flow from the first battery pack 50A to the power switching network 310. In the example illustrated in FIG. 13, connecting the second battery pack 50B is performed before disconnecting the first battery pack 50A. However, it should be understand that these steps may also be performed in the reverse order. That is, the electronic processor 302 may disconnect the first battery pack 50A from the power switching network 310 before connecting the second battery pack 50B to the power switching network 310. Further, in some embodiments, the electronic processor 302 may disconnect the first battery pack 50A from the power switching network 310 simultaneously with connecting the second battery pack 50B to the power switching network 310.

In some embodiments, the electronic processor 302 may activate the indicators 330 to indicate a status of a battery pack 50 to the user. For example, the electronic processor 302 may indicate that a battery pack 50 is connected, disconnected, and/or discharged using the indicators 330. In one example, the electronic processor 302 may turn on a different indicator 330 associated with each of the above status or may light the indicator 330 associated with a battery pack 50 in different colors based on the status of the battery pack 50. The user may then replace a depleted battery pack 50 with a fully or partially charged battery pack 50 such that the method 400 can repeat to connect the first battery pack 50A when the second battery pack 50B is depleted. The method 400 thereby allows a user to continuously run the gas engine replacement device 10 while changing battery packs 50 during operation. Such an application is useful, for example, when the gas engine replacement device 10 is used for pumps (requiring continuous operation), material moving carts/buggies (such that the depleted battery pack 50 may be swapped when a user is near a charger), concrete mixers, and flat concrete saws.

FIG. 13 is described with respect to embodiments in which, generally, the first battery pack 50A or the second battery pack 50B is connected to the power switching network 310 at a given time during operation of the gas engine replacement device 10, but not both packs. In other embodiments, both battery packs 50A and 50B are connected to the power switching network. For example, the battery packs 50A and 50B may be connected in parallel to the power switching network while the state of charge of the respective packs is above the predetermined threshold. When either of the battery packs 50A or 50B has a state of charge that drops below the predetermined threshold, that battery pack 50A or 50B is disconnected from the power switching network 310 via the respective first switch 350 or second switch 354. At this point, the gas engine replacement device 10 is powered by the remaining battery pack 50A or 50B that is still connected, and the user may replace the depleted battery pack 50A or 50B with a fully or partially charged battery pack 50. Upon replacement, the electronic processor 302 may control the associated first switch 350 or second switch 354 to connect the newly inserted battery pack 50 to the power switching network 310, in parallel with the battery pack 50A or 50B that was not removed. In another example, the battery packs 50A and 50B are coupled in series to the power switching network, providing a higher supply voltage for the gas engine replacement device 10. In some embodiments of the series connected battery packs 50A and 50B, a single switch 350 may be provided in series with the battery packs 50A and 50B. Then, when either of the battery packs 50A or 50B has a state of charge that drops below the predetermined threshold, the switch 350 opens to disconnect both battery packs 50A and 50B.

Figure 14:
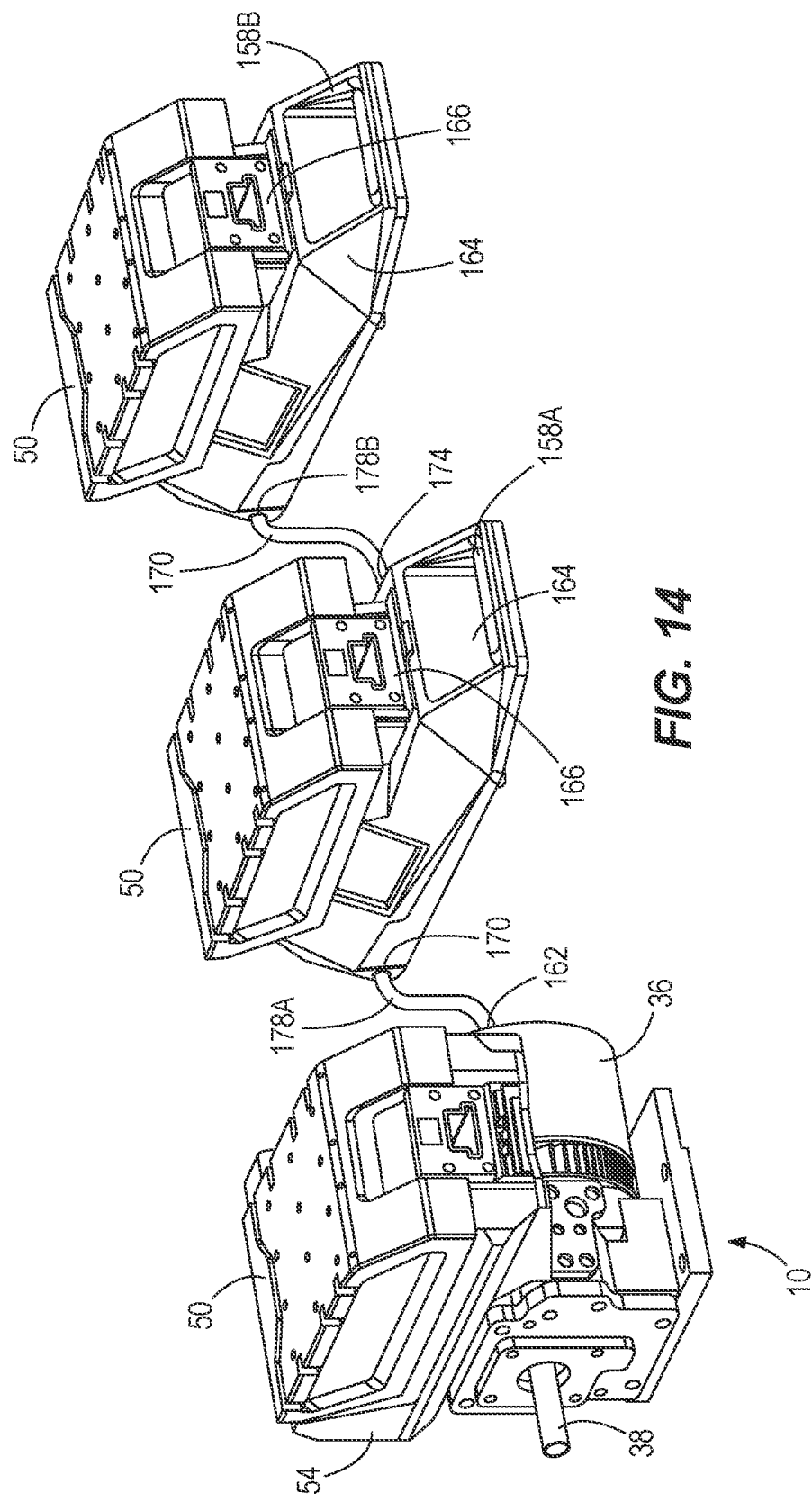
FIG. 14 is a perspective view of a gas engine replacement device in accordance with some embodiments.

FIG. 14 illustrates several battery modules 158 that can be daisy-chained with the battery receptacle 54 on the housing 14 of the gas engine replacement device 10. The gas engine replacement device 10 includes a module port 162 (e.g., on the housing 14) to connect to one or more of the battery modules 158. Each battery module 158 includes a module housing 164 including a module battery receptacle 166. The module battery receptacle 166 is similar to the battery receptacle 54 on the housing 14 of the gas engine replacement device 10, with each module battery receptacle 166 including an electrical and mechanical interface to engage a battery pack 50. The battery packs 50 are received in the module battery receptacle 166. The module housing 164 includes an output connector port 170 and an input connector port 174. A first cord 178A is used to couple a first battery module 158A to the gas engine replacement device 10. The first cord 178A couples the output connector port 170 to the module port 162 to provide operating current from a first battery pack 50A received in the first battery module 158A to the gas engine replacement device 10. A second cord 178B is used to couple a second battery module 158B to the first battery module 158A to provide operating current from a second battery pack 50B received in the second battery module 158B to the first battery module 158A. The first battery module 158A passes the operating current from the second battery module 158B along with the operating current from the first battery pack 50A to the gas engine replacement device 10 through the first cord 178A. In some embodiments, the battery module 158 can be mounted directly on to the gas engine replacement device 10 or the power equipment powered by the gas engine replacement device 10.

Figure 15:
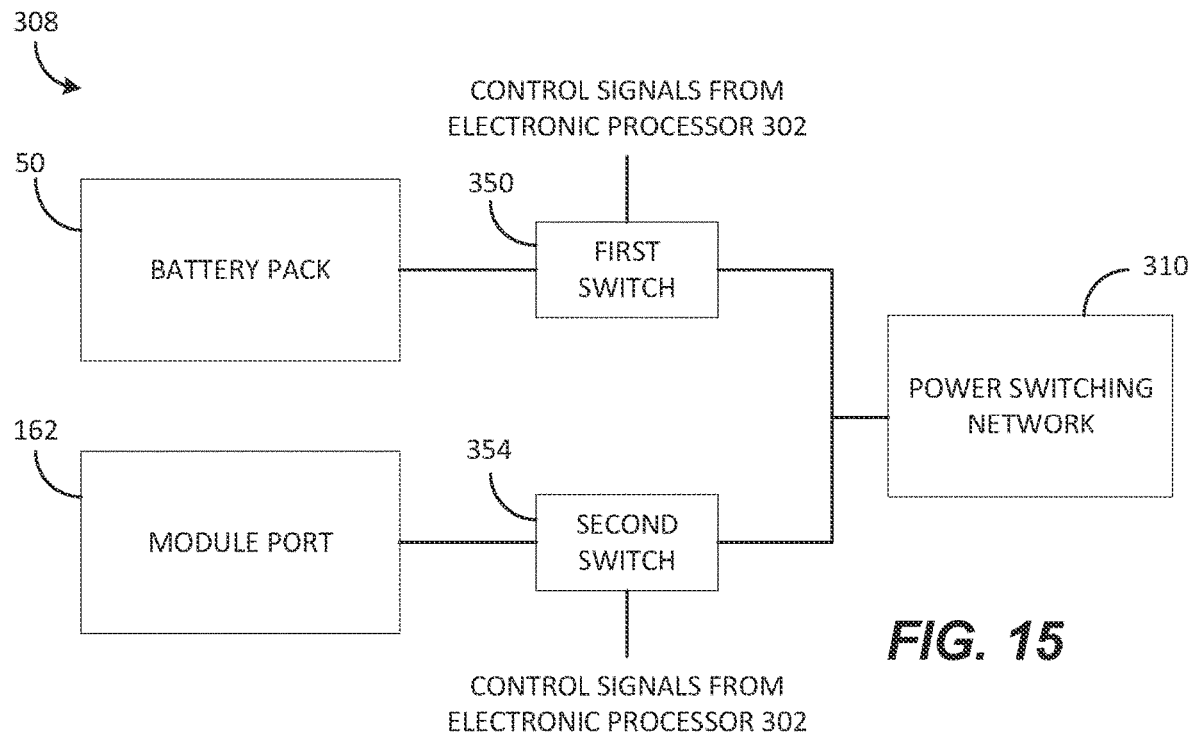
FIG. 15 is a block diagram of a power source of the gas engine replacement device of FIG. 14.

FIG. 15 is a simplified block diagram of the power source 308 according to another example embodiment. The power source 308 includes a battery pack 50 and a module port 162 and corresponds to the gas engine replacement device 10 of FIG. 14. The power switching network 310 is coupled to the battery pack 50 through a first switch 350 and to the module port 162 through a second switch 354. The module port 162 is used to connect one or more battery modules 158 to the gas engine replacement device 10. The first switch 350 and the second switch 354 are, for example, FETs that are controlled by the electronic processor 302 to be enabled and disabled. When the first switch 350 is enabled, the first switch 350 allows current flow from the battery pack 50 to the power switching network 310. When the first switch 350 is disabled, the first switch 350 blocks current flow from the battery pack 50 to the power switching network 310. The second switch 354 is similarly controlled by the electronic processor 302 to allow and block current flow from the one or more battery modules 158 to the power switching network 310.

Figure 16:
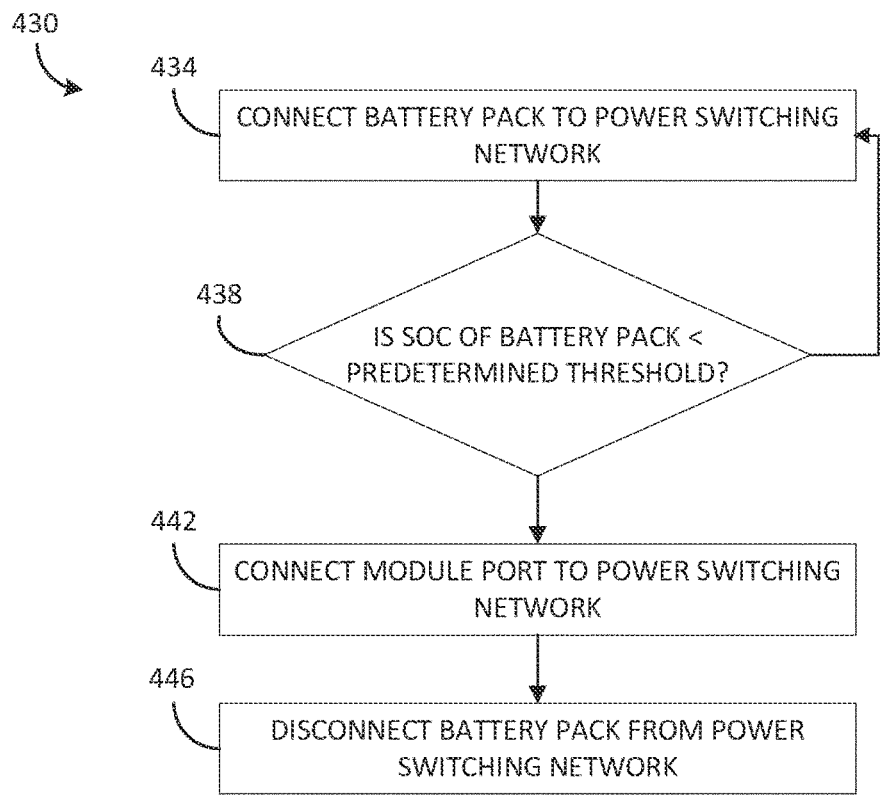
FIG. 16 is a flowchart of a method for increasing runtime of the gas engine replacement device of FIGS. 14-15.

During operation, the electronic processor 302 may connect only one of the battery pack 50 and the one or more battery modules 158 to the power switching network 310. The electronic processor 302 discharges the battery pack 50 and one or more battery modules 158 sequentially to increase the runtime of the gas engine replacement device 10. FIG. 16 is a flowchart of an example method 430 for increasing a runtime of the gas engine replacement device 10. In the example illustrated, the method 430 includes connecting, using the first switch 350, the battery pack 50 to the power switching network 310 (at block 434). The electronic processor 302 controls the first switch 350 to allow current flow from the battery pack 50 to the power switching network 310. Prior to enabling the first switch 350, the electronic processor 302 may determine whether the battery pack 50 is received in the battery receptacle 54 and whether the state of charge of the battery pack 50 is above a predetermined threshold.

The method 430 includes determining whether the state of charge of the battery pack 50 is below the predetermined threshold (at block 438). In some embodiments, the gas engine replacement device 10 includes a voltage sensor (e.g., the voltage sensor 320) to measure a voltage of the battery pack 50. The electronic processor 302 determines the state of charge of the battery pack 50 using the voltage sensor. In other embodiments, the battery pack 50 includes an internal voltage sensor that determines a state of charge of the battery pack 50. The electronic processor 302 communicates with a battery electronic processor of the battery pack 50 to receive the state of charge of the battery pack 50 from the battery electronic processor. For example, the battery pack 50 provides the state of charge information to the electronic processor 302 during a group read.

When the state of charge of the battery pack 50 is above the predetermined threshold, the method 430 returns to block 434 and continues to operate the gas engine replacement device 10 using the battery pack 50. When the state of charge of the battery pack 50 is below the predetermined threshold, the method 400 includes connecting, using the second switch 354, the module port 162 to the power switching network 310 (at block 442). The electronic processor 302 controls the second switch 354 to allow current flow from the module port 162 to the power switching network 310. In other words, a battery module 158, having an attached battery pack 50, is coupled to the module port 162, and when the module port 162 is connected to the power switching network 310 via the second switch 354, power from the battery pack 50 of the battery module 158 is connected to the power switching network 310 and powers the gas engine replacement device 10. Similarly as above, prior to enabling the second switch 354, the electronic processor 302 may determine whether a battery module 158 including a battery pack 50 is connected to the module port 162 and whether the state of charge of the battery pack 50 received in the battery module 158 is above the predetermined threshold.

The method 430 also includes disconnecting, using the first switch 350, the battery pack 50 from the power switching network 310 (at block 446). The electronic processor 302 controls the first switch 350 to block current flow from the battery pack 50 to the power switching network 310. In the example illustrated in FIG. 16, connecting the module port 162 is performed before disconnecting the battery pack 50. However, these steps may also be performed in the reverse order. That is, the electronic processor 302 may disconnect the battery pack 50 from the power switching network 310 before connecting the module port 162 to the power switching network 310. Further, in some embodiments, the electronic processor 302 may disconnect the battery pack 50 from the power switching network 310 simultaneously with connecting the module port 162 to the power switching network 310.

The method 430 thereby allows a user to continuously run the gas engine replacement device 10 while daisy-chaining additional battery packs 50 during operation without removing the currently mounted battery pack 50. Such an application is useful in, for example, a stationary application, for example, pumps, concrete/mortar mixers, and the like with the battery modules 158 mounted to the power equipment. The method 430 also provides the advantage of maximum flexibility for implementing more batteries. Particularly, a user may decide how many batteries would be needed for a task. Additionally, with this embodiment, additional battery receptacles 54 are not required on the housing 14 of the gas engine replacement device 10 thereby providing a better form factor for the gas engine replacement device 10.

FIG. 16 is described with respect to embodiments in which, generally, the battery pack 50 or the module port 162 is connected to the power switching network 310 at a given time during operation of the gas engine replacement device 10, but not both packs. In other embodiments, both the battery pack 50 and the module port 162 are connected to the power switching network. For example, the battery pack 50 and the module port 162 may be connected in parallel or in series, similar to the alternative embodiments describe above with respect to FIG. 13.

In some embodiments, the motor 36 may be temporarily stopped or the operation of the motor 36 may be temporarily restricted when the electronic processor 302 is switching between power sources. For example, the electronic processor 302 may control the power switching network 310 to stop the motor 36 after determining that the first battery pack 50A or the battery pack 50 is depleted. The electronic processor 302 then enables the first switch 350 and disables the second switch 354 before resuming the operation of the motor 36. In some embodiments, rather than stopping the motor 36, the electronic processor 302 may coast the motor 36 while switching between the power sources.

Figure 17A:
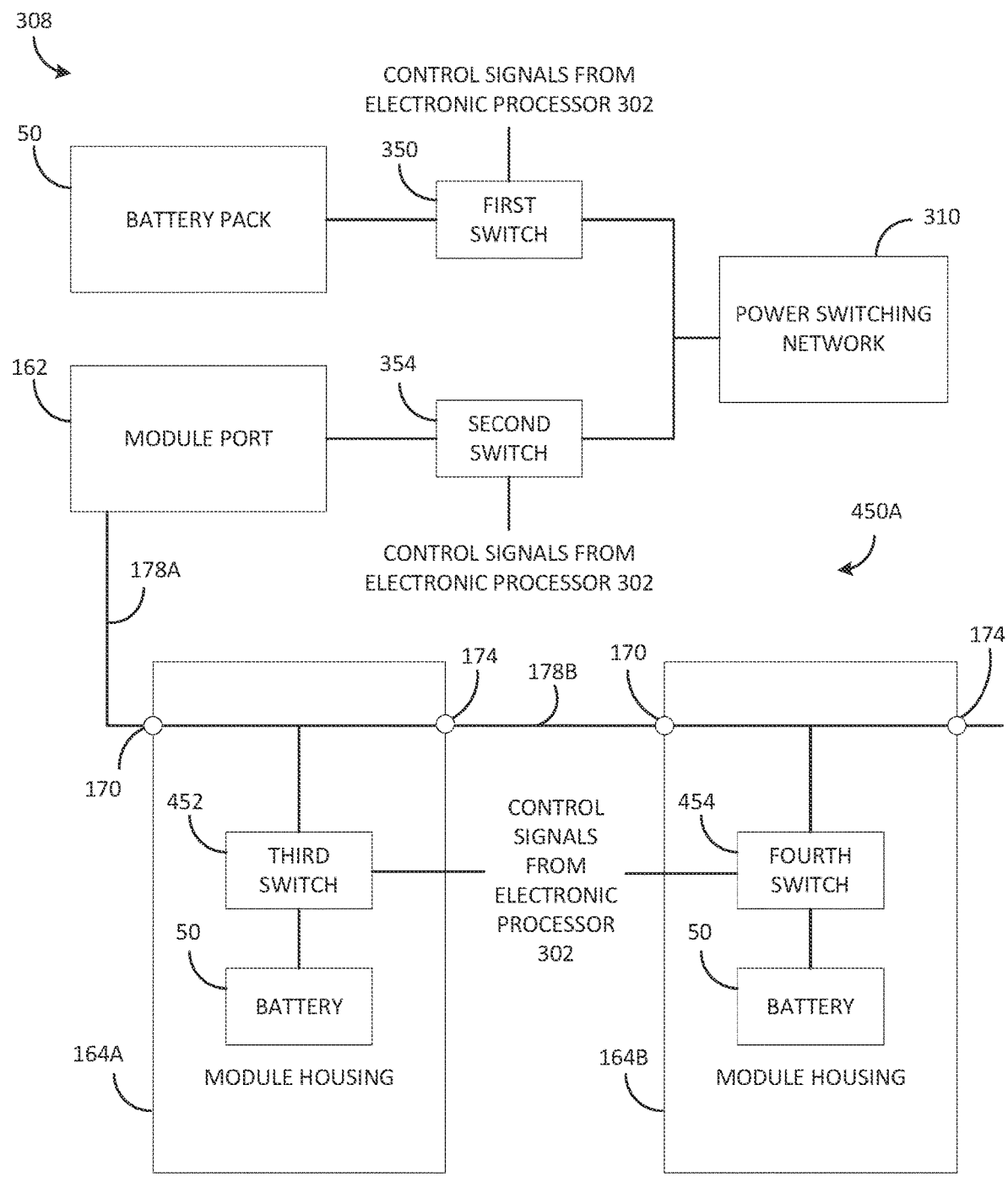
FIGS. 17A and 17B illustrate daisy-chain circuits that enable daisy-chained battery packs to power the gas engine replacement device 10, in accordance with some embodiments.
Figure 17B:
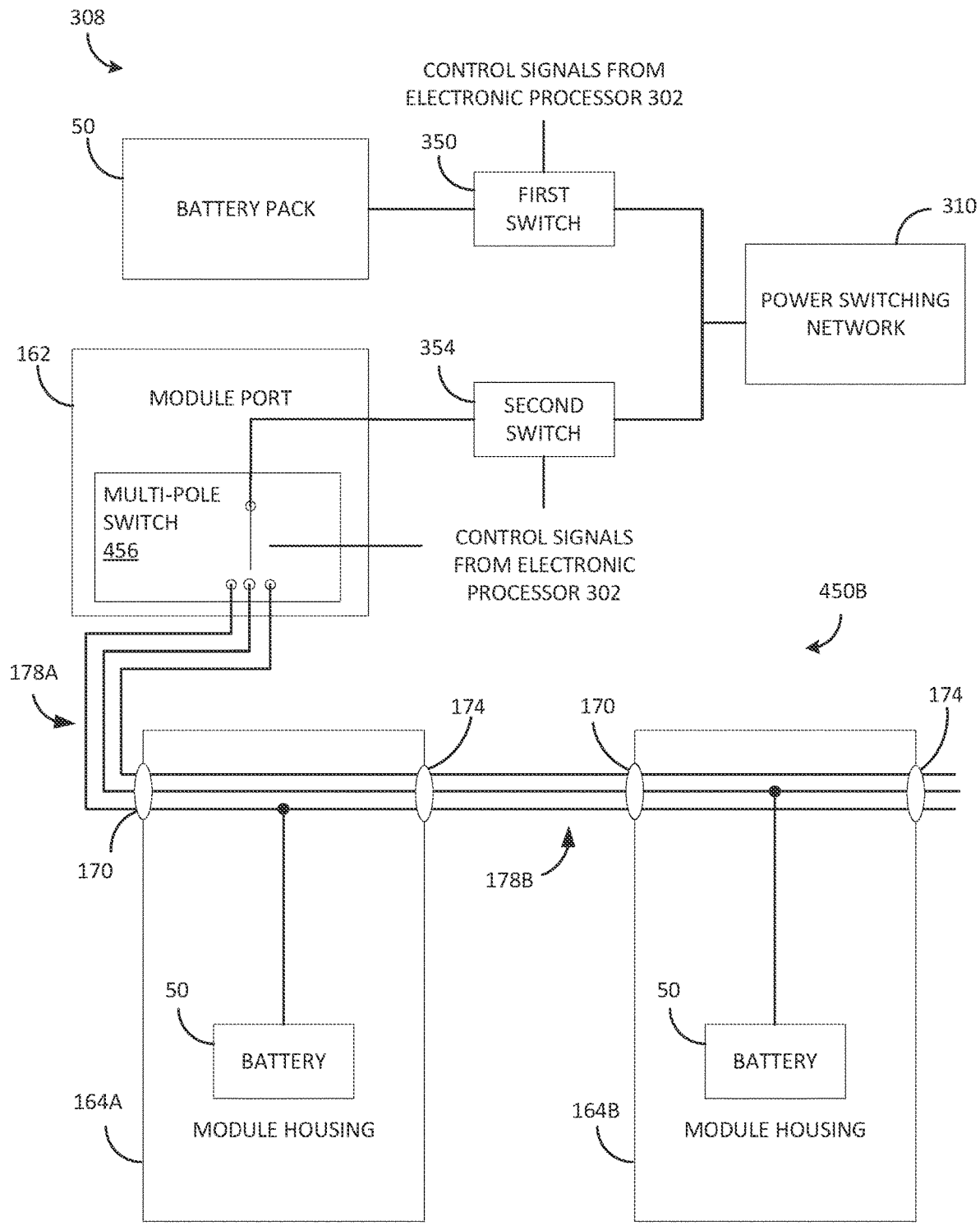

FIGS. 17A-17B illustrate two daisy-chain circuits 450A and 450B, respectively, that enable daisy-chained battery packs 50 connected to the module port 162 of FIGS. 14 and 15 to power the power switching network 310, and, thereby, the gas engine replacement device 10. In FIG. 17A, the module port 162 is coupled to two module housings 164 (individually identified as 164A and 164B, respectively) having respective battery packs 50. As illustrated, the cords 178A and 178B form a DC bus link to the module port 162, whereby the battery pack 50 of the module housing 164A is coupled to the bus link via a third switch 452 and the battery pack 50 of the module port 164B is coupled to the bus link 178 via a fourth switch 454. The third switch 452 and fourth switch 454 are selectively controlled by the electronic processor 302. Accordingly, the respective battery packs 50 of the module housing 164A and module housing 164B may be selectively coupled to the module port 162 and, thus, the power switching network 310. Returning to block 442 of FIG. 16, when the module port 162 is connected to the power switching network 310 via the second switch 354, the electronic processor 302 may further provide control signals to the third switch 452, the fourth switch 454, or both, to select one or both of the batteries 50 coupled to the module housings 164A-B to provide power to the power switching network 310. The control signals may be provided from the electronic processor 302 via the module port over data lines of the cords 178A-B. For example, a control line per module housing 164 may be provided, or a shared control line may be used with control signals having an associated address that identifies the module housing 164 to receive the control signals. The module housings 164 (or their respective switches), in turn, may act in response to control signals intended for themselves, and filter out control signals intended for other module housings 164.

In FIG. 17B, the module port 162 is again coupled to the two module housings 164 (individually identified as 164A and 164B, respectively) having respective battery packs 50. As illustrated, the cords 178A and 178B form a DC bus link to the module port 162, whereby the battery pack 50 of the module housings 164A and 165B are coupled to the bus link. Instead of individual switches included within the module housings 164A-B, a multi-pole switch 456 is included as part of the module port 162 in the gas engine replacement device 10. In some embodiments, the multi-pole switch 456 may be incorporated within one of the module housings 164. The DC bus link includes separate power supply lines connecting the module port 162 to module housings 164, one for each module housing 164. The multi-pole switch 456 is selectively controlled by the electronic processor 302 to select one of the power supply lines of the DC bus link. Accordingly, the respective battery packs 50 of the module housing 164A and module housing 164B may be selectively coupled to the module port 162 and, thus, the power switching network 310. Returning to block 442 of FIG. 16, when the module port 162 is connected to the power switching network 310 via the second switch 354, the electronic processor 302 may further provide control signals to the multi-pole switch 456, to select one or both of the batteries 50 coupled to the module housings 164A-B to provide power to the power switching network 310.

While three power supply lines and a 3-to-1 multi-pole switch are illustrated as part of the cords 178A and 178B in FIG. 17B, in some embodiments, fewer or more power supply lines are included and a multi-pole switch 456 having a corresponding number of inputs is provided. Generally, for each power supply line included, a one additional module housing 164 with battery pack 50 may be coupled in a daisy chain manner to the module port 162.

With respect to the embodiments of FIGS. 17A and 17B, the electronic controller 302 may select the battery 50 from the plurality of daisy-chained batteries 50 based on a state of charge of the batteries 50. The battery packs 50 may include a voltage sensor or other sensor to measure their own respective state of charge, and provide the measured state of charge to the electronic controller 302 via a data line of the cords 178A and 178B, or the gas engine replacement device 10 may include a voltage sensor or other sensor to measure the state of charge of whichever battery pack 50 is coupled via the module port 162. In some embodiments, when the module port 162 is selected to provide power (e.g., in step 442 of FIG. 16), the electronic controller 302 determines the state of charge for each battery pack 50 connected via daisy chain to the module port 162, and then selects the battery pack 50 having the highest state of charge. Thereafter, the electronic controller 302 may monitor the state of charge of the selected battery pack 50, and, when the state of charge drops below a predetermined threshold, switch to the battery pack 50 having the highest state of charge at that point in time. In some embodiments, other battery pack 50 selection criteria and techniques are used to select from the battery packs 50 coupled to the module port 162.

Figure 18:
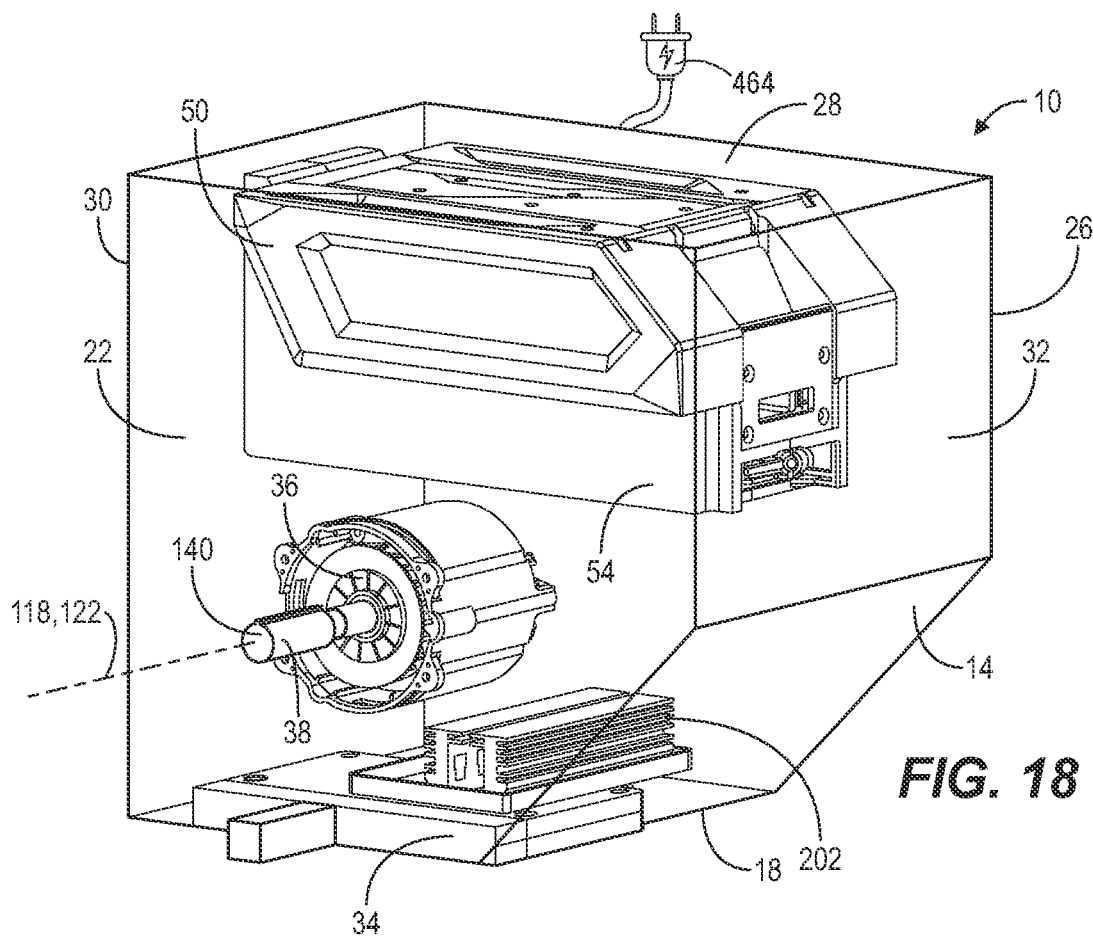
FIG. 18 is a perspective view of a gas engine replacement device in accordance with some embodiments.
Figure 19:
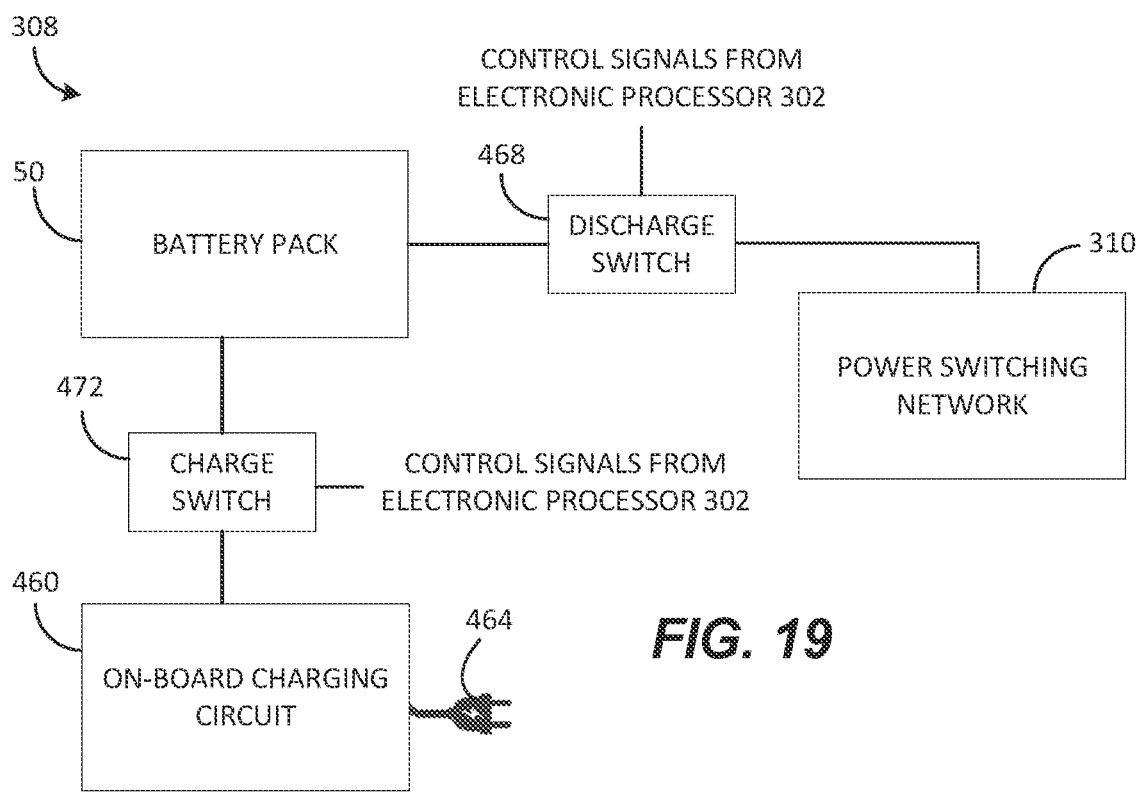
FIG. 19 is a block diagram of a power source of the gas engine replacement device of FIG. 18.

In some embodiments, as shown in FIGS. 18-19, the gas engine replacement device 10 includes an on-board charging circuit 460 to charge a battery pack 50 connected to the gas engine replacement device 10. The gas engine replacement device 10 includes a power cord 464 that can be plugged into a power outlet (e.g., a 120 VAC/60 Hz wall outlet or other standard power outlet) to receive charging power to charge the battery pack 50. The on-board charging circuit 460 receives the charging power from the power cord 464 and, when enabled, provides charging current to charge the battery pack 50.

FIG. 19 is a simplified block diagram of the power source 308 according to another example embodiment. The power source 308 includes a battery pack 50 and the on-board charging circuit 460 to charge the battery pack 50. The battery pack 50 is coupled to the power switching network 310 through a discharge switch 468. The on-board charging circuit 460 is coupled to the battery pack 50 through a charge switch 472. The discharge switch 468 and the charge switch 472 are, for example, FETs that are controlled by the electronic processor 302 to be enabled and disabled. When the discharge switch 468 is enabled, the discharge switch 468 allows current flow from the battery pack 50 to the power switching network 310. When the discharge switch 468 is disabled, the discharge switch 468 blocks current flow from the battery pack 50 to the power switching network 310. When the charge switch 472 is enabled, the charge switch 472 allows current flow from the on-board charging circuit 460 to the battery pack 50 to charge the battery pack 50. When the charge switch 472 is disabled, the charge switch 472 blocks current flow from the on-board charging circuit 460 to the battery pack 50.

In some embodiments, the electronic processor 302 may control the discharge switch 468 and the charge switch 472 such that both the discharge switch 468 and the charge switch 472 are not enabled at the same time. Accordingly, the motor 36 of the gas engine replacement device 10 may not be operating while the battery pack 50 is being charged.

In some embodiments, the electronic processor 302 may control the discharge switch 468 and the charge switch 472 such that both the discharge switch 468 and the charge switch 472 are enabled at the same time. Accordingly, the motor 36 of the gas engine replacement device 10 may be operating while the battery pack 50 is being charged. For example, the charging circuit 460 pay provide a trickle charge to the battery pack 50 when the power cord 464 is coupled to an AC source. Further, an AC/DC rectifier circuit may be provided in the gas engine replacement device 10 (e.g., in the on-board charging circuit 460) that provides DC output on a DC bus connecting the power switching network 310 and the battery pack 50. Thus, the power switching network 310 would pull DC power from the rectifier, and the AC power from the power cord 464 would power the motor 36. Further, when the current drawn from the rectifier is below a certain current limit for the wall outlet coupled to the power cord 464, the excess current (the amount of current between the present current draw and the current limit) charges the battery pack 50. In some embodiments, the DC bus includes a capacitor between the positive DC bus line and negative DC bus line, which smooths ripple on the DC bus, and the charging current is drawn from the capacitor.

In some embodiments, the gas engine replacement device 10 includes charge enable switch that may be actuated by a user. When the charge enable switch is actuated, the electronic processor 302 begins charging the battery pack 50 by disabling the discharge switch 468 and enabling the charge switch 472. In some embodiments, when the electronic processor 302 determines that the state of charge of the battery pack 50 drops below a predetermined threshold (e.g., using the voltage sensor 320 or upon receiving an indication from the battery pack 50, as described above), the electronic processor actuates the charge enable switch and deactivates the discharge switch 468, and the on-board charging circuit 460 begins charging the battery pack 50.

In one example, the gas engine replacement device 10 of FIGS. 18-19 is used for rental fleets. Equipment rental companies may prefer to lock certain features of rented equipment to prevent theft. In the case of gas engine replacement devices 10, the rental companies may want to lock the battery packs 50 to the gas engine replacement device 10 such that the battery packs 50 cannot be removed from the gas engine replacement device 10. In these situations, the on-board charging circuit 460 may be used to charge the battery pack 50 while the battery pack 50 is coupled to the gas engine replacement device 10.

FIG. 1-18 are shown as including separate embodiments of the gas engine replacement device 10. However, it should be understood that the features of any of these embodiments may be combined with features of other embodiments. For example, the gas engine replacement device 10 may include multiple battery receptacles 54 as well as the module port 162 to connect to one or more battery modules 158. Additionally, the gas engine replacement device 10 may include an on-board charging circuit 460 as well as multiple battery receptacles 54 and/or the module port 162. Further, it should be understood that the one or more battery receptacles 54 may receive a battery pack 50 of any configuration. For example, the first battery receptacle 54A may receive the battery pack 50-1 having a first configuration and the second battery receptacle 54B may receive the battery pack 50-2 having a second configuration. Additionally, a user may replace the battery pack 50-1 having a first configuration and received in the battery receptacle 54 with the battery pack 50-2 having a second configuration. Thus, in some of the embodiments of the gas engine replacement devices 10 described above, the gas engine replacement device 10 is configured to be coupled to different types of the battery pack 50.

We claim:

1. A gas engine replacement device comprising:
   a housing including a first side surface and a second side surface;
   a first battery receptacle and a second battery receptacle provided on the housing, wherein the first battery receptacle is defined on the first side surface along a first plane and the second battery receptacle is defined on the second side surface along a second plane that is parallel to the first plane;
   a first battery pack and a second battery pack, the first battery pack slidably received downward from a top surface of the housing within the first battery pack receptacle and the second battery pack slidably received downward from the top surface of the housing within the second battery pack receptacle, wherein the top surface is along a third plane, and wherein the first battery pack and the second battery pack protrude from the housing when slidably received within the first battery pack receptacle and the second battery pack receptacle;
   a motor within the housing;
   a power take-off shaft protruding from a third side surface of the housing along a fourth plane and receiving torque from the motor;
   a power switching network connected to the motor, the first battery pack, and the second battery pack and configured to drive the motor; and
   an electronic processor connected to the power switching network and configured to:
      determine a first state of charge of the first battery pack,
      determine a second state of charge of the second battery pack,
      determine a highest state of charge between the first state of charge and the second state of charge,
      select either the first battery pack or the second battery pack based upon the highest state of charge,
      connect the selected first battery pack or the second battery pack to the power switching network, and
      discharge the selected battery pack to the power switching network to drive the motor,
   wherein the third side surface along the fourth plane is perpendicular to the first side surface along the first plane and the second side surface along the second plane and parallel to the top surface along the third plane.

2. The gas engine replacement device of claim 1, wherein the electronic processor is further configured to:
   connect the first battery pack to the power switching network;
   determine whether the first state of charge of the first battery pack is below a predetermined threshold; and
   when the first state of charge of the first battery pack is below the predetermined threshold:
      connect the second battery pack to the power switching network; and
      disconnect the first battery pack from the power switching network.

3. The gas engine replacement device of claim 2, further comprising:
   a first switch configured to connect the first battery pack to the power switching network; and
   a second switch configured to connect the second battery pack to the power switching network,
   wherein the electronic processor is further configured to control the first switch and the second switch to selectively connect and disconnect the first battery pack and the second battery pack to the power switching network.

4. The gas engine replacement device of claim 1, further comprising:
an on-board charging circuit configured to charge the first battery pack, wherein the first battery pack is connected to the power switching network through a discharge switch and connected to the on-board charging circuit through a charge switch.

5. The gas engine replacement device of claim 4, further comprising:
a power cord provided on the housing and configured to provide charging power to the on-board charging circuit.

6. The gas engine replacement device of claim 4, wherein the electronic processor is connected to the discharge switch and the charge switch and is further configured to:
connect the first battery pack to the power switching network to operate the motor; and
connect the first battery pack to the on-board charging circuit to charge the first battery pack.

7. The gas engine replacement device of claim 1, wherein the first battery pack has a nominal voltage of at least 80 Volts.

8. The gas engine replacement device of claim 1, further comprising:
a flange provided on the side of the housing, wherein the power take-off shaft protrudes from the flange, wherein the flange includes a first bolt pattern configured to align with a second bolt pattern of a power equipment driven by the gas engine replacement device.

9. A gas engine replacement device comprising:
a housing including a first side surface and a second side surface opposite the first side surface;
a first battery receptacle and a second battery receptacle provided within the housing, wherein the first battery receptacle is defined on the first side surface along a first plane and the second battery receptacle is defined on the second side surface along a second plane that is parallel to the first plane;
a first battery pack slidably received downward from a top surface of the housing within the first battery receptacle;
a second battery pack slidably received downward from the top surface of the housing within the second battery receptacle, wherein the top surface is along a third plane;
a motor within the housing;
a power take-off shaft protruding from a third side surface of the housing along a fourth plane and receiving torque from the motor;
a power switching network connected to the motor, the first battery pack, and the second battery pack;
a first switch configured to connect the first battery pack to the power switching network;
a second switch configured to connect the second battery pack to the power switching network; and
an electronic processor connected to the first switch, the second switch, and the power switching network, the electronic processor configured to:
connect, using the first switch, the first battery pack to the power switching network, determine a first state of charge of the first battery pack,
determine a second state of charge of the second battery pack, and
when the first state of charge of the first battery pack is below the second state of charge of the second battery pack:
connect, using the second switch, the second battery pack to the power switching network; and
disconnect, using the first switch, the first battery pack from the power switching network,
wherein the third side surface along the fourth plane is perpendicular to the first side surface along the first plane and the second side surface along the second plane and parallel to the top surface along the third plane, and
wherein the first battery pack and the second battery pack protrude from the housing when slidably received within the first battery pack receptacle and the second battery pack receptacle.

10. The gas engine replacement device of claim 9, further comprising:
an on-board charging circuit configured to charge the first battery pack, wherein the first battery pack is connected to the on-board charging circuit through a charge switch.

11. The gas engine replacement device of claim 10, further comprising:
a power cord provided on the housing and configured to provide charging power to the on-board charging circuit.

12. The gas engine replacement device of claim 10, wherein the electronic processor is connected to the first switch and the charge switch and is further configured to:
connect the first battery pack to the power switching network to operate the motor; and
connect the first battery pack to the on-board charging circuit to charge the first battery pack.

13. The gas engine replacement device of claim 9, wherein the first battery pack has a nominal voltage of at least 80 Volts.

14. The gas engine replacement device of claim 9, further comprising:
a flange provided on the side of the housing, wherein the power take-off shaft protrudes from the flange, wherein the flange includes a first bolt pattern configured to align with a second bolt pattern of a power equipment driven by the gas engine replacement device.

15. The gas engine replacement device of claim 9, wherein the housing includes a support provided between the first battery pack receptacle and the second battery pack receptacle.

16. The gas engine replacement device of claim 15, wherein the first battery pack and the second battery pack are slidably received on opposite sides of the support.

17. The gas engine replacement device of claim 9, wherein a handle extends from the housing.

18. A method for increasing runtime of a gas engine replacement device, the gas engine replacement device including a first battery pack connected to a power switching network through a first switch and a second battery pack connected to the power switching network through a second switch, the method comprising:
connecting, using the first switch, the first battery pack slidably received downward from a top surface of a housing within a first battery pack receptacle on a first side surface the housing of the gas engine replacement device to the power switching network to power a motor included in the housing, wherein the top surface is along a first plane and the first side surface is along a second plane, wherein a power take-off shaft protruding from a second side surface of the housing along a third plane receives torque from the motor;

determining, using an electronic processor of the gas engine replacement device, whether a first state of charge of the first battery pack is below a second state of charge of the second battery pack; and when the first state of charge of the first battery pack is below the second state of charge of the second battery pack:

connecting the second battery pack slidably received downward from the top surface of the housing within a second battery pack receptacle on a third side surface of the housing along a fourth plane to the power switching network, and disconnecting the first battery pack from the power switching network, wherein the second side surface along the third plane is perpendicular to the first side surface along the second plane and the third side surface along the fourth plane and parallel the top surface along the first plane, and wherein the first battery pack and the second battery pack protrude from the housing when slidably received within the first battery pack receptacle and the second battery pack receptacle.

19. The method of claim 18, wherein the first battery pack is connected to an on-board charging circuit through a charge switch.

20. The method of claim 19, further comprising:
connecting, using the charge switch, the first battery pack to the on-board charging circuit to charge the first battery pack.

* * * * *